US012614173B2

(12) United States Patent　(10) Patent No.:　US 12,614,173 B2
Cinelli　(45) Date of Patent:　Apr. 28, 2026

(54) ELECTRONIC SYSTEM AND METHOD FOR ENABLING PAYMENT OF A GOOD OR SERVICE BY MEANS OF VOICE COMMANDS

(71) Applicant: VOICEME S.R.L., Milan (IT)

(72) Inventor: Andrea Cinelli, Milan (IT)

(73) Assignee: VOICEME S.R.L., Milan (IT)

( * ) Notice: Subject to any disclaimer, the term of this patent is extended or adjusted under 35 U.S.C. 154(b) by 80 days.

(21) Appl. No.: 18/003,742

(22) PCT Filed: Jun. 21, 2021

(86) PCT No.: PCT/IB2021/055428
　§ 371 (c)(1),
　(2) Date: Dec. 29, 2022

(87) PCT Pub. No.: WO2022/003474
　PCT Pub. Date: Jan. 6, 2022

(65) Prior Publication Data
　US 2023/0259928 A1　Aug. 17, 2023

(30) Foreign Application Priority Data
　Jul. 2, 2020　(IT) ........................ 102020000015973

(51) Int. Cl.
　*G06Q 20/38*　(2012.01)
　*G06Q 10/083*　(2024.01)
　(Continued)

(52) U.S. Cl.
　CPC ......... *G06Q 20/386* (2020.05); *G06Q 10/083* (2013.01); *G06Q 10/087* (2013.01);
　(Continued)

(58) Field of Classification Search
　CPC ............. G06Q 20/386; G06Q 30/3255; G06Q 20/40145; G06Q 20/42; G06V 40/172; G01L 15/22; G10L 2015/223
　(Continued)

(56) References Cited

U.S. PATENT DOCUMENTS 8,489,507　B1 *　7/2013　Dayalan ............... G06Q 20/367
　　　　　　　　　　　　　　　705/44
8,554,674　B1 *　10/2013　Subealdea, Jr. ........ G06Q 40/02
　　　　　　　　　　　　　　　705/40
　　　　　　(Continued)

OTHER PUBLICATIONS

International Search Report and Written Opinion, mailed Oct. 13, 2021, from PCT/IB2021/055428.

*Primary Examiner* — Robert R Niquette
(74) *Attorney, Agent, or Firm* — Workman Nydegger

(57)　　　　ABSTRACT

A method and system are disclosed for enabling payment of a good or service by means of voice commands. The method and system comprise a voice assistant, an electronic human language processor connected to the voice assistant, an
(Continued)

application for delivering services to be paid connected to the electronic human language processor, an operative server device connected to the application for delivering services to be paid, a first authentication server device connected to the operative server device, a second authentication server device connected to the operative server device, a payment server device connected to the operative server device and an electronic device.

18 Claims, 15 Drawing Sheets

(51) Int. Cl.

| | | |
|---|---|---|
| *G06Q 10/087* | (2023.01) | |
| *G06Q 20/32* | (2012.01) | |
| *G06Q 20/40* | (2012.01) | |
| *G06Q 20/42* | (2012.01) | |
| *G06V 40/16* | (2022.01) | |
| *G10L 15/22* | (2006.01) | |

(52) U.S. Cl.
CPC ... *G06Q 20/3255* (2013.01); *G06Q 20/40145* (2013.01); *G06Q 20/42* (2013.01); *G06V 40/172* (2022.01); *G10L 15/22* (2013.01); *G10L 2015/223* (2013.01)

(58) Field of Classification Search
USPC ...................................................... 705/35–45
See application file for complete search history.

(56) References Cited

U.S. PATENT DOCUMENTS

| | | | | |
|---|---|---|---|---|
| 10,810,574 | B1* | 10/2020 | Wilson | G06Q 20/389 |
| 2003/0229588 | A1* | 12/2003 | Falk | G06Q 30/04 |
| | | | | 705/40 |
| 2009/0006264 | A1* | 1/2009 | Schultz | G06Q 20/4014 |
| | | | | 705/67 |
| 2009/0037173 | A1* | 2/2009 | Hansen | G06Q 20/341 |
| | | | | 704/E15.001 |
| 2015/0193776 | A1* | 7/2015 | Douglas | G06Q 20/20 |
| | | | | 705/16 |
| 2017/0330183 | A1* | 11/2017 | Modi | G06Q 20/10 |
| 2017/0337558 | A1* | 11/2017 | Corritori | G06Q 20/20 |
| 2018/0033436 | A1* | 2/2018 | Zhou | G10L 15/02 |
| 2018/0108001 | A1* | 4/2018 | Taylor | G06Q 20/12 |
| 2018/0357645 | A1* | 12/2018 | Caution | G10L 15/22 |
| 2020/0097952 | A1* | 3/2020 | Piparsaniya | G06F 3/167 |
| 2020/0258072 | A1* | 8/2020 | Unnerstall | G06F 3/167 |
| 2021/0043189 | A1* | 2/2021 | Pyun | G06F 21/32 |
| 2021/0287223 | A1* | 9/2021 | Lee | G06Q 20/3272 |

* cited by examiner

ELECTRONIC SYSTEM AND METHOD FOR ENABLING PAYMENT OF A GOOD OR SERVICE BY MEANS OF VOICE COMMANDS

BACKGROUND

Technical Field

The present disclosure generally relates to the field of voice assistants.

More specifically, the present disclosure relates to a system and method for enabling payment of a good or service with a medium-high security level, by means of the use of voice commands from the subject requesting the delivery of the service to be paid or the purchase of a good.

Description of the Related Art

The use of voice assistants is known, which allow a subject to use voice commands in order to obtain various types of information, such as the weather forecast, the results of a football match, request the playback of music tracks, the translation of a sentence in a certain language, etc.

Said voice assistants can be realized by means of dedicated electronic devices (also known as "smart speakers"), such as Amazon Alexa and Google Home.

Alternatively, voice assistants can be realized using software programs, such as Google Assistant for smartphones, or tablets which use the Android operating system, or Siri for iPhones or iPads.

Digital payment systems such as PayPal, Amazon Pay or Apple Pay are known, which have the advantage of allowing the payment for a good or service purchased online simply by clicking on a button indicating the payment by means of one of the systems indicated above, without requiring entering the data of a credit card and exploiting an account which was previously created by the user.

The Applicant has observed that the known payment systems have the following drawbacks:

they do not enable payment for a good or service using voice commands with a sufficient level of security, including through different applications (applications of a bank, payment for services in a home);

they do not respect the protection of personal data (privacy), in particular GDPR regulations;

they do not comply with EIDAS regulations.

BRIEF SUMMARY

One embodiment of the present disclosure relates to a method and system for enabling payment of a good or service by means of voice commands of a subject requesting the purchase of a good or service, wherein the method and system are defined in the accompanying claims 1 and 8, respectively, and by the embodiments thereof described in the dependent claims 2 to 6, 13-17, 9-10 and 18.

The Applicant has perceived that the system and method for enabling payment of a good or service in accordance with the present disclosure allow the use of voice and/or face profiles to enable payment for a good or service with a medium-high level of security, while respecting the requirements of the protection of personal data (in particular the GDPR regulation, EU Regulation no. 679/2016) and possibly also those of the EIDAS regulation (Electronic Identification Authentication and Signature), EU Regulation no. 910/2014.

The basic idea is to use two or more server devices to provide the information necessary to enable payment of the good or service, in which each of the two servers stores a respective different portion of a reference voice and/or face profile (or feature vector) of the subject requesting the good or service (depending on the security level for the requested good or service), thus the reference voice and/or face profile (or the reference feature vector associated with the voice signal) is recomposed on a separate electronic device, which enables payment of the requested good or service as a function of the comparison between the reference voice and/or face profile and a sample voice and/or face profile acquired in real time or as a function of the comparison between a reference feature vector and a sample feature vector generated in real time: thereby the profile (or feature vector) and the information of the subject are not normally available to any of the elements which contribute to realizing the purchase and payment transaction of the good or service, but are available only in the short time when the payment of the requested good or service is enabled.

One embodiment of the present disclosure is a non-transitory computer-readable storage medium as defined in the accompanying claim 7.

One embodiment of the present disclosure is an operative server device as defined in the accompanying claim 11.

One embodiment of the present disclosure is a mobile electronic device as defined in the accompanying claim 12.

BRIEF DESCRIPTION OF THE SEVERAL VIEW OF THE DRAWINGS

Additional features and advantages of the disclosure will become more apparent from the description which follows of a embodiment and the variants thereof, provided by way of example with reference to the appended drawings, in which.

DETAILED DESCRIPTION

It should be noted that in the description below, identical or similar blocks, components or modules, even if they appear in different embodiments of the disclosure, are indicated by the same numerical references in the figures.

Figure 1:
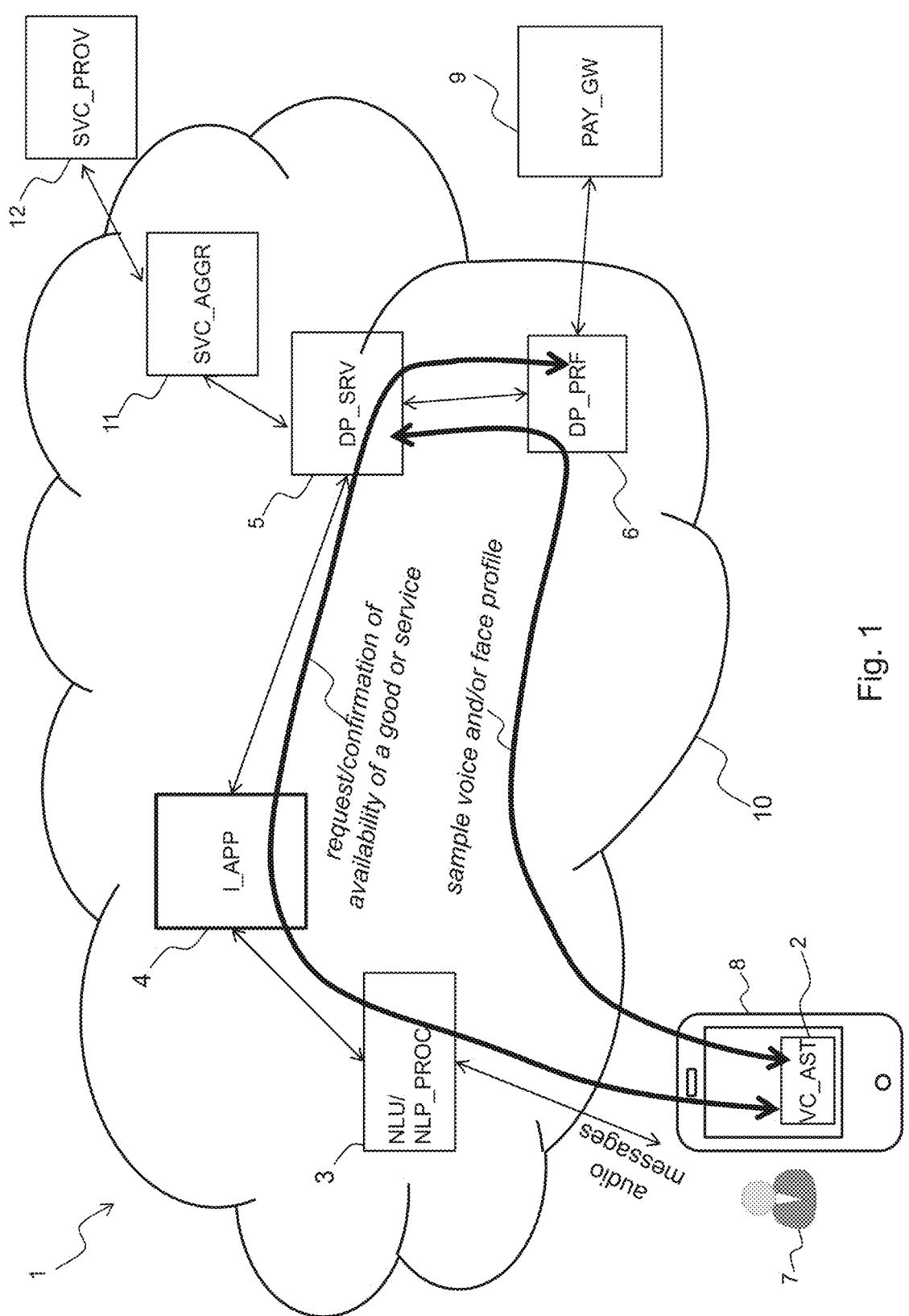
FIG. 1 shows a block diagram of an electronic system for enabling payment of a good or service by means of voice commands according to a first embodiment of the disclosure.

With reference to FIG. 1, a block diagram of an electronic system 1 for enabling payment of a good or service by means of voice commands is shown according to the first embodiment of the disclosure.

The good or service is requested by the subject 7 and can be, for example:

a booking of a medical examination;

the purchase of a book in digital format;

the purchase of a financial product;

the purchase of food;

the booking of a holiday.

The electronic system 1 comprises:

a voice assistant 2;

an electronic device 8, for example a mobile type;

an electronic human language processor 3;

an application 4 for delivering services to be paid;

a profile decoding and payment enabling server device 5;

a profiling server device 6;

a payment server device 9.

In one embodiment, the electronic system 1 further comprises a service aggregator 11 and at least one external service provider 12, which will be explained in more detail below.

The set of the electronic human language processor 3, the application for delivering services to be paid 4, the profile decoding and payment enabling server device 5 and possibly the service aggregator 11 constitutes a voice platform based on Artificial Intelligence and on NLU (Natural Language Understanding) and NLP (Natural Language Processing) techniques, which perform an analysis of the spoken human language and understand the sense of the spoken language.

The electronic processor 3, the application for delivering services to be paid 4 and the profile decoding and payment enabling server device 5 are included within a medium-long distance telecommunications network 10, for example the Internet network which uses the TCP/IP protocol, with a client-server architecture and use of Web Services.

The profiling server device 6, the payment server device 9 and the service aggregator 11 can be positioned outside the network 10 or therein.

A subject 7 uses the electronic system 1 to request enabling to the payment for a certain good or service using only voice commands: the subject 7 (which is supposed to have already been previously identified by means of a profiling procedure by means of the profiling server device 6) first requests the delivery of a good or service to be paid, then receives confirmation of the availability and cost of the requested service, then is identified by means of the comparison of biometric profiles of the voice and/or face type (and possibly also use of OTP), finally is enabled to make the payment for the requested good or service and subsequently the subject 7 receives the requested service delivered directly by the profile decoding and payment enabling server device 5 or by the external service provider 12 connected to the profile decoding and payment enabling server device 5 by means of the service aggregator 11 and by means of the activation of a web service.

The voice assistant 2 has the function of interpreting human language and dialoguing therewith.

The voice assistant 2 can be a dedicated electronic device (smart speaker), such as Amazon Echo/Echo Dot (with Alexa) or Google Home.

Alternatively, the voice assistant 2 is a software application (i.e., a software program) performed by means of a processor of the electronic device 8 (typically mobile), such as the Google Assistant application for smartphones, or tablets which use the Android operating system, or the Sin application for iPhones or iPads, or the Cortana voice assistant for personal computers with Windows operating system: in this case the voice assistant and the device 8 are implemented in a single electronic component (for example, a smartphone or iPhone or a personal computer).

If the voice assistant 2 is a dedicated electronic voice assistant device, this comprises a speaker, a microphone and a processing unit which executes an appropriate program capable of interpreting human language and communicating therewith (for example, the Alexa program developed by Amazon); furthermore, the electronic voice assistant device 2 comprises a suitable transceiver for exchanging audio messages with the electronic processor 3, through the telecommunications network 10.

If the voice assistant 2 is instead a software application running on the processor of the electronic device 8 (for example, a smartphone or tablet), the microphone and speaker (and possibly a camera) integrated in the electronic device 8 itself are used and the transceiver integrated in the electronic device 8 itself is used to exchange audio messages with the human language electronic processor 3.

The voice assistant 2 is configured to receive from the subject 7 a voice signal indicative of a request for delivering a good or service to be paid and is configured to transmit towards the electronic human language processor 3 an audio message indicative of the request for delivering the good or service.

Furthermore, the voice assistant 2 is configured to receive from the human language processor 3 an audio message indicative of a confirmation or rejection of the availability of the requested good or service, then the voice assistant 2 is configured to generate towards the subject 7 a voice signal indicative of said confirmation or rejection of the availability of the requested good or service.

Furthermore, if the voice assistant 2 is such as to receive the audio message indicative of the confirmation of the availability of the requested good or service, the voice assistant 2 is configured to receive from the subject 7 a voice signal indicative of the confirmation of the wish to pay for the requested good or service, then the voice assistant 2 is configured to transmit towards the human language electronic processor 3 an audio message indicative of said confirmation of the wish to pay for the requested good or service.

Furthermore, the voice assistant 2 is configured to receive from the human language processor 3 an audio message indicative of a defined phrase, therefore the voice assistant 2 is configured to generate towards the subject 7 a voice signal indicative of said defined phrase.

Furthermore, if the voice assistant 2 is such as to receive the audio message indicative of the defined phrase, the voice assistant 2 is configured to receive from the subject 7 a sample voice signal representative of the voice of the subject 7, then the voice assistant 2 is configured to forward the sample voice signal towards the electronic device.

Lastly, the voice assistant 2 is configured to receive from the human language processor 3 an audio message indicative of a confirmation or rejection of the payment for the requested good or service, then the voice assistant 2 is configured to generate towards the subject 7 a voice signal indicative of an authorization or a rejection of the payment for the requested good or service.

The electronic device 8 belongs to the subject 7 and can be a fixed type (for example, a personal computer) or a mobile type (for example, a smartphone, tablet or laptop computer).

The electronic device 8 comprises a speaker and a microphone and, preferably, a camera.

It is assumed that the subject 7 has already been identified (by means of the profiling server device 6) in a previous profiling procedure in a secure condition, in which personal data of the subject has been acquired, such as his/her name, surname, telephone number, identity card and a reference voice and/or face profile of the subject 7.

During the profiling procedure, a unique identifier of the subject 7 was associated with the electronic device 8.

For example, the electronic device 8 is a smartphone provided with a SIM card and thus the unique identifier of the subject 7 is the phone number associated with the SIM card.

The term "reference voice profile" means a reference profile of the digital identity of the subject 7 generated as a function of the voice signal representative of the voice of the subject 7, wherein said reference voice profile has been previously acquired from the subject 7 in a profiling procedure by means of the profiling server device 6 and in secure conditions, and in which said reference voice profile has been stored at least in part in a memory of the profiling server device 6: the reference voice profile has therefore been previously verified and is considered reliable.

In one embodiment, in addition to the voice signal of the subject 7, in the first embodiment one or more images representative of the face of the subject 7 are acquired, thus generating a reference voice/face profile as a function of the voice signal and of the image of the face of the subject 7, wherein said reference voice/face profile has been previously acquired in the profiling procedure by means of the profiling server device 6 and in secure conditions, and wherein said reference voice/face profile has also been stored at least in part in the memory of the profiling server device 6.

For example, in the profiling procedure a video recording is acquired in which at least the face of the subject 7 is framed and in which the subject says a defined phrase aloud, thus generating the reference voice/face profile.

It is therefore possible to use the electronic system 1 based on two levels of security:

a medium security level (level 1), wherein only the voice profile of the subject 7 (i.e., a single authentication factor) is used to perform an online verification of his/her identity, in order to enable the payment for the requested good or service;

a medium-high level of security (level 2), wherein a double authentication factor is used to perform an online verification of his/her identity, in order to enable the payment for the requested good or service, wherein the two factors can be, alternatively:

the voice or face profile of the subject 7;

the voice profile of the subject 7 and an OTP code, valid only once for a limited time;

the face profile of the subject 7 and the OTP code.

In one embodiment, the electronic system 1 uses a high level of security (level 3) to perform an online verification of the identity of the subject 7, wherein a triple authentication factor is used which comprises the voice profile of the subject 7, the face profile of the subject 7 and the OTP code valid only once for a limited time (OTP): thereby the triple factor EIDAS regulation is respected.

For example, the reference voice profile is implemented with an alphanumeric code generated by means of a suitable hash algorithm which receives in input a digital audio track representative of the voice of the subject and generates in output (by means of said hash algorithm) an alphanumeric code (also indicated with a fingerprint), i.e., a string of alphanumeric characters.

Similarly, the reference voice/face profile is implemented for example with an alphanumeric code generated by means of a suitable hash algorithm which receives in input a digital audio track of the voice of the subject 7 and data representative of the image of the face of the subject 7 and generates in output (by means of said hash algorithm) an alphanumeric code (fingerprint), i.e., a string of alphanumeric characters.

In one embodiment, the reference voice profile of the subject 7 is divided into a plurality of portions greater than or equal to two and it is stored into a data structure of a blockchain.

In one embodiment, the reference voice and/or face profile is divided into two portions, wherein a first portion is stored in a memory 6-1 associated with the profiling server device 6 and the second portion is stored in a memory 9-1 associated with the payment server device 9: this allows maximum security to be ensured through a so-called "double helix" mechanism in which the two reference profiles (for example, two alphanumeric codes generated with a hash algorithm) present in the memory 6-1 and in the memory 9-1 are recomposed on the profile decoding server device 5 (through a random algorithm) to reconstruct the complete reference profile (for example, an alphanumeric code generated with a hash algorithm) of the voice or voice/face type.

In one embodiment, the first and/or second portion of the reference voice (or voice/face) profile are stored in a data structure of a blockchain.

The above considerations related to the subdivision of the reference voice profile are similarly applicable to a reference voice/face profile, which also includes biometric data associated with a image representative of the face of the subject 7, or of a part thereof comprising at least the eyes, nose and mouth.

Therefore during the profiling procedure a photo of the face of the subject 7 is taken (by means of a camera of an electronic device 8, for example the front camera of a smartphone) and an image of the face of the subject 7 is acquired therefrom, then a reference voice/face profile is generated (by means of a random algorithm) as a function of the digital audio track of the voice of the subject 7 and of the acquired image of the face of the subject 7; the reference voice/face profile is divided into two portions, of which a first portion is stored in the memory 6-1 associated with the profiling server device 6, while a second portion is stored in the memory 9-1 associated with the payment server device 9.

The electronic device 8 is configured to receive from the profiling server device 6 a request to acquire a sample voice profile and/or a sample voice/face biometric profile of the subject 7, wherein said request can be a voice call or a text message or a multimedia message (i.e., of an audio or audio-video type) or an email message.

The term "sample voice profile" means a sample digital identity profile of the subject 7 associated with the sample digital audio track of the voice of the subject 7, wherein said sample digital audio track is generated by means of the conversion from analog to digital of the voice of the subject 7 acquired in real time by means of the microphone integrated in the electronic device 8.

The term "sample voice/face profile" means data associated with a combination of the sample digital audio track of the voice of the subject and biometric data associated with the face of the subject 7, the latter generated by means of an image of the face of the subject 7 acquired with a camera integrated in the electronic device 8.

For example, a video recording is acquired in real time in which at least the face of the subject 7 is framed and in which the subject says a defined phrase aloud, thus generating the sample voice/face profile.

For example, the sample voice profile is implemented with an alphanumeric code generated by means of a suitable hash algorithm which receives in input a sample digital audio track representative of the voice of the subject 7 and possibly also data representative of the face profile of the subject 7 and generates in output (by means of said hash algorithm) an alphanumeric code (digital fingerprint), i.e., a string of alphanumeric characters.

The sample digital audio track is acquired by addressing to the subject 7 (by means of the voice assistant 2) one or more defined phrases (i.e., known in advance) and acquiring (by means of the same voice assistant 2) one or more corresponding responses from the subject 7, wherein said responses constitute the voice of the subject 7 which is converted from analog to digital, generating a sample digital audio track, which is used to generate the sample voice profile, then said sample digital audio track will then be forwarded to the profile decoding and payment enabling server device 5, crossing the electronic processor 3, the application for delivering services to be paid 4 and the profiling server device 6.

For example, the subject 7 is asked (by means of the voice assistant 2) to say one or more of the following defined phrases:

"I am name and surname and this is my voice";

"I pay with Voicepay".

In one embodiment, more than one phrase is exchanged between the subject 7 and the voice assistant 2, in order to acquire the voice signal of the voice of the subject 7 and generate the sample digital audio track, such as the following sequence of phrases:

> subject 7: "I am [NAME] and [SURNAME] and this is my voice", where the [NAME] and [SURNAME] is the actual name and surname of the subject 7;
> Voice assistant 2: "Hi [NAME] and [SURNAME], can you tell me what day it is today and what time it is?";
> subject 7: "Today is [DAY] and it is [TIME]", wherein [DAY] and [TIME] are the actual day and time of the current instant;
> Voice assistant "Can you tell me the address where you are located?";
> subject 7: "I am at [STREET] in [CITY]", where [STREET] and [CITY] are those where the subject 7 is located.

Alternatively, the voice signal representative of the voice of the subject 7 is acquired by means of the electronic device 8 which receives a text message (for example, an SMS) transmitted by the profiling server device 6, wherein said text message contains an alphanumeric code, then the subject 7 is asked to read the alphanumeric code of the text message received at the electronic device 8.

The face profile is instead acquired by asking the subject 7 to take a selfie (i.e., a photograph of himself/herself) by means of an audio, audio-video, SMS message transmitted from the profiling server device 6 to the electronic device 8.

The electronic device 8 is further configured to transmit to the profiling server device 6 an audio message representative of the sample voice profile of the subject 7, or an audio-video message representative of the sample voice/face profile of the subject 7.

More in particular, the voice assistant 2 is configured to receive a voice signal (i.e., an acoustic wave) generated by the subject 7 indicative of a request for delivering a good or service and to convert (by means of the microphone 2-2) said voice signal into an audio message indicative of a request for delivering the good or service, such as a service which requires a medium (level 1) or medium-high (level 2) level of security.

The voice assistant 2 is configured to transmit towards the human language electronic processor 3 an audio message indicative of the request for delivering a good or service.

The voice assistant 2 is further configured to receive from the human language processor 3 an audio message carrying a confirmation or a rejection of payment for the requested good or service, then the electronic voice assistant device 2 is configured to generate to the subject 7 (by means of the speaker of the voice assistant 2 or by means of the speaker incorporated in the electronic device 8) a voice signal (i.e., an acoustic wave) carrying said confirmation or rejection of payment for the requested good or service.

The human language processor 3 has the function of receiving from the voice assistant 2 an audio message carrying the voice of the subject 7 and of performing voice recognition functions of the voice of the subject 7 himself/herself, in particular the analysis and understanding of the language of the subject 7, thus performing a conversion of the received audio message into a text string representative of the content of the audio message.

Furthermore, the electronic processor 3 is capable of independently sending answers to questions from the subject 7 in audio format.

The electronic processor 3 also has the function of performing a conversion of a text string into an audio signal.

More specifically, the electronic processor 3 is based on artificial intelligence, which allows to analyse the spoken human language and to understand the sense of the spoken language, by means of techniques known with NLU (Natural Language Understanding) and NLP (Natural Language Processing): in this case the electronic processor 3 is an NLU/NLP server device.

For example, the electronic processor 3 is the cloud platform of Amazon Alexa or of Google Assistant.

In particular, the electronic processor 3 is configured to receive from the voice assistant 2 an audio message representative of a request for delivering a good or service, then the electronic processor 3 is configured to transmit towards the application for delivering services to be paid 4 an audio message representative of said request for delivering the good or service.

Finally, the electronic processor 3 is configured to receive from the application for delivering services to be paid 4 a text message carrying a confirmation or a rejection of the payment for the requested good or service, is configured to perform a conversion of the text message received into an audio message indicative of the confirmation or rejection of the payment for the requested good or service, then the electronic processor 3 is configured to transmit towards the voice assistant 2 said audio message indicative of the confirmation or rejection of the requested good or service.

For example, if the voice assistant 2 is an Amazon device (Amazon Echo, Amazon Echo Dot), the electronic processor 3 is the set of web services provided by the cloud computing platform known as Amazon Web Service (AWS), see the website aws.amazon.com.

The application for delivering services to be paid 4 is a software program (also referred to as "Voice pay") which has the function of requesting the availability of a good or service to be paid, requesting the payment for the requested good or service and confirming or denying the payment for the requested good or service.

There are several applications for delivering services to be paid 4, one for each good or service to be purchased.

For each particular application for delivering services to be paid 4, a particular defined phrase is associated (or configured), by means of which the corresponding application for delivering services to be paid 4 is activated.

For example, the application for delivering services to be paid 4 is associated with the purchase of a pizza and is activated by the subject 7 who says (towards the voice assistant 2) the phrase "Voice Pay, I would like to buy a pizza", then the Pizza application 4 is activated.

Another example is the booking of a medical examination: in this case the subject 7 says the phrase "Voice Pay, I would like to book a medical examination", then the Medical application 4 is activated.

In particular, the application for delivering services to be paid 4 is configured to receive a request for enabling payment from a subject requesting payment for the purchase of a good or service (in particular, a service which requires a medium or medium-high level of security), by means of the exchange of audio and text messages with the electronic processor 3 and with the profile decoding and payment enabling server device 5.

If the electronic processor 3 is implemented with an NLU/NLP cloud computing platform, the application for delivering services to be paid 4 is installed in the cloud where the electronic processor 3 is present.

The application for delivering services to be paid 4 is configured to receive from the electronic processor 3 a text message carrying a request for delivery of a good or service with a certain type of payment, then the application for delivering services to be paid 4 forwards said request for delivery of the good or service to the profile decoding and payment enabling server device 5.

Furthermore, the application for delivering services to be paid 4 is configured to transmit towards the electronic processor 3 a text message carrying a confirmation or rejection of payment for the requested good or service.

For example, if the voice assistant 2 is realized with Amazon Echo, the application for delivering services to be paid 4 is a new skill that allows to request the availability of a good or service to be paid, request payment for the requested good or service (for example, the purchase of a book or the payment for a medical examination) and confirm payment for the good or service, using only voice commands.

The profile decoding and payment enabling server device 5 is an electronic device which comprises a transceiver for exchanging data with the application for delivering services to be paid 4, with the profiling server device 6 and possibly with the service aggregator 11, as will be explained in more detail below.

The profile decoding and payment enabling server device 5 further comprises a processing unit (for example, a microprocessor) running a software program to perform the functions which will be illustrated below.

The profile decoding and payment enabling server device 5 has the function of decoding the two portions of the reference voice profile (or decoding the two portions of the reference voice/face profile) and composing the two portions of the reference voice profile (or composing the two portions of the reference voice/face profile) by means of a random algorithm, so as to generate the reference voice (or voice/face) profile.

The term "random algorithm" means that each time the reference profile is generated as a function of the first and second portion of the reference profile, the hash function used to generate the alphanumeric code associated with the first portion of the reference profile and the alphanumeric code associated with the second portion of the reference profile is changed, thus generating two different alphanumeric codes each time, as long as the final result (i.e., the alphanumeric code associated with the reconstructed reference profile) always has the same value for the same biometric reference information.

Therefore the profile decoding and payment enabling server device 5 has the function of confirming or rejecting the identity of the subject 7 and the function of enabling or rejecting (as if it were a traffic light) the payment for the requested good or service by the subject 7 using voice commands, by means of the comparison between the sample voice and/or face profile of the subject 7 (generated in real time by means of the electronic device 8) and the reference voice and/or face profile.

In particular, the profile decoding and payment enabling server device 5 is configured to receive from the application for delivering services to be paid 4 a message indicative of a request for availability of the good or service and it is configured to forward it to the profile decoding and payment enabling server device 5; furthermore, the profile decoding and payment enabling server device 5 is configured to receive from the service aggregator 11 a message indicative of a confirmation of availability of the requested good or service and indicative of a request for payment for the requested good or service and the related cost, or receive a message indicative of a rejection of availability of the requested service or good, then the profile decoding and payment enabling server device 5 is configured to forward said message to the application for delivering services to be paid 4.

Furthermore, the profile decoding and payment enabling server device 5 is configured to receive from the application for delivering services to be paid 4 a message indicative of a payment request for the requested good or service, then the profile decoding and payment enabling server device 5 is configured to transmit to the profiling server device 6 a message indicative of a request for enabling payment for the requested good or service.

Furthermore, the profile decoding and payment enabling server device 5 is configured to receive from the profiling server device 6 the sample digital audio track representative of the voice of the subject 7 (and possibly an image representative of at least part of the face of the subject 7), together with the first and second portion of the reference voice profile, then the profile decoding and payment enabling server device 5 is configured to generate the sample digital audio profile representative of the voice of the subject 7 (or generate the voice/face profile as a function of the sample digital audio track of the voice of the subject 7 and the image representative of at least part of the face of the subject 7), finally the profile decoding and payment enabling server device 5 is configured to recompose the first and second portion of the reference voice profile, generating the reference voice profile therefrom.

Furthermore, the profile decoding and payment enabling server device 5 is configured to perform a comparison between the sample voice (or voice/face) profile of the subject 7 (generated in real time by means of the electronic device 8) and the reference voice (or voice/face) profile (obtained by recomposing the two portions), in order to perform the recognition of the subject 7 and therefore enable or reject the payment.

Said enabling of payment is obtained by verifying whether the sample voice (or voice/face) profile is compatible with the reference voice (or voice/face) profile, or by verifying if both profiles belong to the same person (i.e., the subject 7), and also by verifying if the subject 7 is authorized to make the payment for the requested good or service.

If the payment is enabled, the profile decoding and payment enabling server device 5 is configured to transmit to the application for delivering services to be paid 4 (and possibly to the service aggregator 11) a message indicative of a confirmation of payment for the requested good or service.

If the payment is not enabled, the profile decoding and payment enabling server device 5 is configured to transmit to the application for delivering services to be paid 4 (and possibly to the service aggregator 11) a message indicative of a rejection of payment for the requested good or service.

When the profile decoding and payment enabling server device 5 verifies that the sample biometric voice (or voice/face) profile is compatible with the reference biometric voice (or voice/face) profile of the subject 7 (previously acquired and stored partly in the profiling server device 6 and partly in the payment server device 9) and also verifies that the subject 7 is authorized to make the payment for the requested good or service, the profile decoding and payment enabling server device 5 authorizes (as if it were a traffic light) to make the payment for the requested good or service by the subject 7, thus allowing the application for delivering services to be paid 4 to receive the confirmation of the payment of the requested good or service, and in turn allowing the electronic processor 3 to produce said confirmation on the voice assistant 2 in the form of vocal sounds.

It should be noted that the profile decoding and payment enabling server device 5 is separate from the profiling server device 6, thus increasing the level of payment security, since the device which enables payment (i.e., 5) is separate from the device (i.e., 6) which possesses (at least in part) the personal data of the subject 7, in the form of a voice or voice/face profile, and further the device which enables payment (i.e., 5) possesses the algorithm to regenerate the reference voice (or voice/face) profile, but does not possess the two portions of the reference voice (or voice/face) profile.

The service aggregator 11 has the function of aggregating the services provided by a plurality of external providers, by means of connecting with one or more external service providers 12.

The service aggregator 11 is a software application running on a processing unit of a server device, which performs API (Application Programming Interface) calls to the external service provider 12, in order to know the availability and cost of a particular requested good or service.

The service aggregator 11 is then configured to receive (from the profile decoding and payment enabling server device 5) a message indicative of a request for availability of a requested good or service to be paid, then the service aggregator 11 is configured to transmit towards the external service provider 12 a message indicative of a request for availability of the requested good or service to be paid, by means of a call to an Application Programming Interface (API) of the external service provider 12.

Furthermore, the service aggregator 11 is configured to receive from the external service provider 12 a message indicative of a confirmation of availability of the requested good or service and indicative of a request for payment for the good or service and the respective cost, or indicative of a lack of availability of the requested good or service.

The external service provider 12 has the function of verifying the availability of a particular requested good or service to be paid and the respective cost.

For this purpose, the external service provider 12 comprises a catalogue of the goods or services available, such as:

a list of the medical services which are delivered by a particular healthcare facility and the respective cost;

a list of books which can be purchased and the respective cost;

a list of types of pizza which can be purchased for home delivery and the respective cost.

The external service provider 12 is a software application running on a processing unit of a server device, which exposes an Application Programming Interface (API) having the function of indicative of the availability or non-availability of a certain requested good or service to be paid.

In particular, the external service provider 12 is configured to receive from the service aggregator 11 a message indicative of a request for availability of the requested good or service to be paid, is configured to verify the availability of the requested good or service by means of access to a catalogue and the corresponding cost (and any other details associated with the requested good or service), and is configured to transmit towards the service aggregator 11 a message indicative of a confirmation of availability of the requested good or service and indicative of a request for payment for the good or service and the respective cost, or indicative of a lack of availability of the requested good or service.

It should be noted that for simplicity's sake in FIG. 1 only one external service provider 12 has been shown, but more generally there are two or more external service providers similar to 12 and connected to the service aggregator 11, each external service provider being associated with a different type of delivered good or service, such as:

a first external service provider associated with a list of medical services which can be delivered by a particular healthcare facility;

a second external service provider associated with a catalogue of books which can be purchased in electronic or paper format;

a third external service provider associated with a list of pizza types which can be purchased for home delivery.

It should be noted that the presence of the separate service aggregator 11 is not essential, i.e., the functions performed by the service aggregator 11 can be integrated within the profile decoding and payment enabling server device 5, which is thus further configured to aggregate the services delivered by one or more external service providers similar to 12.

Similarly, the presence of the separate external service provider 12 is not essential, i.e., the functions performed by the external service provider 12 can be integrated within the profile decoding and payment enabling server device 5, which is thus further configured to verify the availability of the requested good or service in a catalogue of goods or services directly associated with the profile decoding and payment enabling server 5.

The profiling server device 6 has the function of profiling the subject 7 during a profiling procedure (prior to the normal operation step of the electronic system 1) which occurs in a condition of maximum security, during which personal data of the subject (such as his/her name, surname, telephone number, identity card), the reference voice profile of the subject 7 and possibly the reference face profile of the subject 7 are acquired.

In one embodiment, the profiling server device 6 is configured to manage payments other than the standard payment system: for example, the payment system used for Alexa is Amazon Pay, while the payment system used by the system in question and present on the payment server device 9 is PayPal.

The profiling server device 6 is connected to a non-volatile memory 6-1 (internal or external) configured to store a first portion of the reference voice and/or face profile of the subject 7.

In particular, the profiling server device 6 is configured to receive from the profile decoding and payment enabling server device 5 a signal carrying a request to enable payment for the requested good or service using a first payment system and is configured to verify if the subject 7 is authorized to make the payment with the first payment system requested.

Furthermore, the profiling server device 6 is configured to transmit towards the electronic device 8 a message indicative of a request to acquire the sample voice (or voice/face) profile of the subject 7, which can be carried by means of, alternatively:

- a voice call from the profiling server device 6 to the electronic device 8, using the telephone number of the subject 7 which was previously acquired in the previous step of profiling the subject 7;
- an audio message transmitted from the profiling server device 6 to the electronic device 8 through the tele-communications network 10, such as a Whatsapp message;
- a multimedia message (i.e., audio-video) transmitted from the profiling server device 6 to the electronic device 8 through the telecommunications network 10, such as a Whatsapp message;
- a text message transmitted from the profiling server device 6 to the electronic device 8 through the tele-communications network 10, such as a Short Message Service (SMS).

Furthermore, the profiling server device 6 is configured to receive from the electronic device 8 a message indicative of a sample voice (or voice/face) profile and is configured to transmit to the payment server device 9 a message indicative of a request for a second portion of the reference voice (or voice/face) profile.

Furthermore, the profiling server device 6 is configured to receive from the payment server device 9 a message carrying a second portion of the reference voice (or voice/face) profile, is configured to read from the memory 6-2 the first portion of the reference voice (or voice/face) profile, and is configured to transmit towards the profile decoding and payment enabling server device 5 a message carrying a sample voice (or voice/face) profile of the subject 7, together with a first and second portion of the reference voice (or voice/face) profile of the subject 7.

If the electronic processor 3 is implemented with an NLU/NLP cloud computing platform, the profiling server device 6 is inside the cloud where the electronic processor 3 is present and is connected through Web Services.

In one embodiment, the profiling server device 6 is connected to a database distributed in a blockchain, where the first portion of the reference voice (or voice/face) profile of the subject 7 is stored.

The payment server device 9 is an electronic device which comprises a transceiver for exchanging data with the profiling server device 6 and further comprises a processing unit (for example, a microprocessor) running a software program to perform the functions which will be illustrated below.

The payment server device 9 is a payment gateway which is located at a third party which manages payment systems, for example at a financial institution or a bank.

The payment server device 9 has the function of managing the payment for the requested good or service.

The payment server device 9 is connected to a non-volatile memory 9-1 (internal or external) configured to store a second portion of the reference voice profile of the subject 7.

In particular, the payment server device 9 is configured to receive from the profiling server device 6 a message indicative of a request for the second portion of the reference voice (or voice/face) profile of the subject 7, is configured to read from the memory 9-1 the second portion of the reference voice (or voice/face) profile and is configured to transmit towards the profiling server device 6 a message carrying said second portion of the reference voice (or voice/face) profile.

Furthermore, the payment server device 9 is configured to receive (from the profile decoding and payment enabling server device 5) a message indicative of a confirmation of the identity of the subject 7 indicative of the fact that the subject 7 has been successfully identified by means of his/her voice (or voice/face) profile and indicative of a request for confirmation of payment for the requested good or service, then the payment server device 9 is configured to transmit to the profiling server device 6 a message indicative of a confirmation of payment for the requested good or service; alternatively, the payment server device 9 is configured to receive a message indicative of a rejection of verification of the identity of the subject 7 indicative of the fact that the subject 7 has not been successfully identified, then the payment server device 9 is configured to transmit to the profiling server device 6 a message indicative of rejection of payment for the requested good or service.

In one embodiment, the payment server device 9 is connected to a database distributed in a blockchain, where the second portion of the reference voice (or voice/face) profile of the subject 7 is stored.

it should be noted that for simplicity's sake in FIG. 1 only one payment server device 9 has been shown, but more generally there may be two or more payment server devices similar to 9 and connected to the profiling server device 6.

In one embodiment, in the electronic system 1 the tracking of the purchase and payment transactions of the requested good or service is carried out, for the purpose of any disputes.

In particular, said tracking comprises recording a voice message of the subject 7, when he/she says the confirmation of the wish to pay for the requested good or service; therefore a voice message representative of the confirmation of the wish to pay for the requested service is stored, for example in a memory associated with the profile decoding and payment enabling server device 5.

In one embodiment, in addition to recording said voice message, the geographical position (i.e., geolocation) of the subject 7 is stored in the same memory, when the subject expresses the confirmation of the wish to pay for the requested good or service: said geographical position can be expressed by means of global coordinates (e.g., of the GPS type), by means of the estimated position by means of the radio mobile network in which the electronic device 8 of the mobile type (smartphone) is located or by means of the network address (typically IP address) uniquely associated with the electronic device 8 of the subject 7.

In one embodiment, in addition to recording the voice and storing the digital audio track representative of the confirmation of the wish to pay for the requested service, the date and time in which the subject 7 expresses the confirmation of the wish to pay for the requested good or service is further stored With reference to FIGS. 2A-2D, the operation of the electronic system 1 is illustrated below.

Figure 2A:
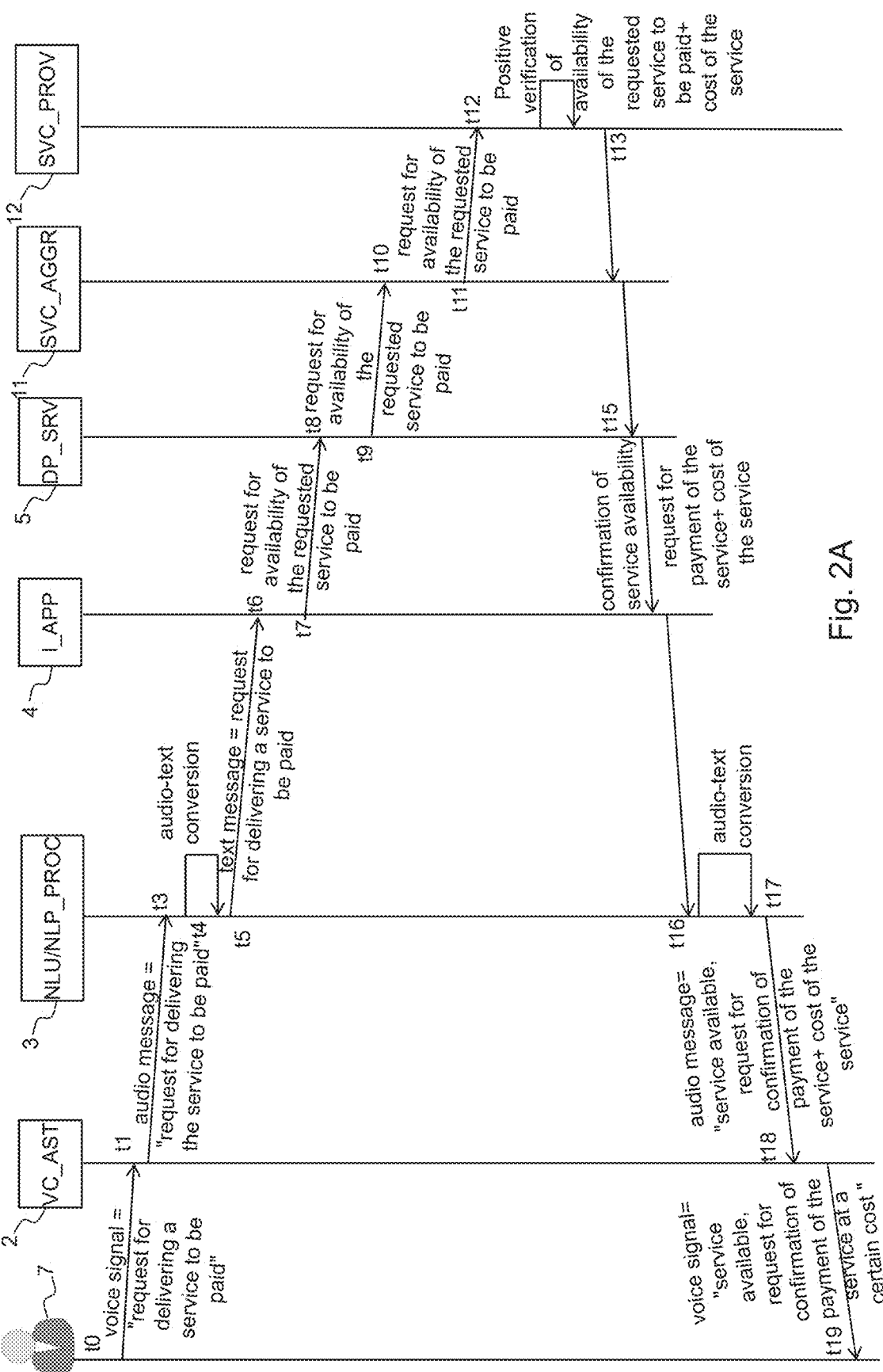
FIGS. 2A-2D show a time trend of the messages exchanged between the different components of the system according to the first embodiment of the disclosure.
Figure 2B:
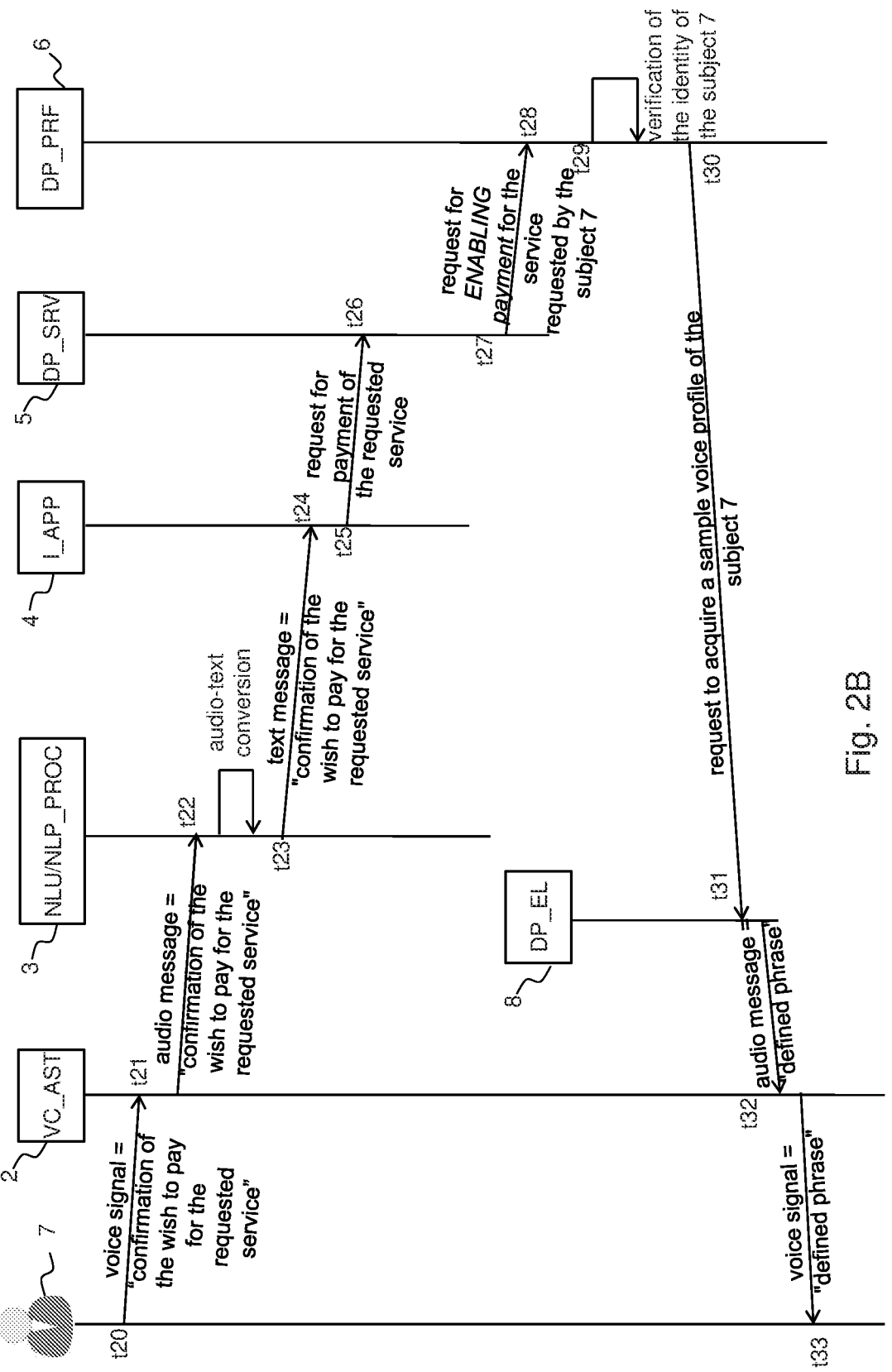
Figure 2C:
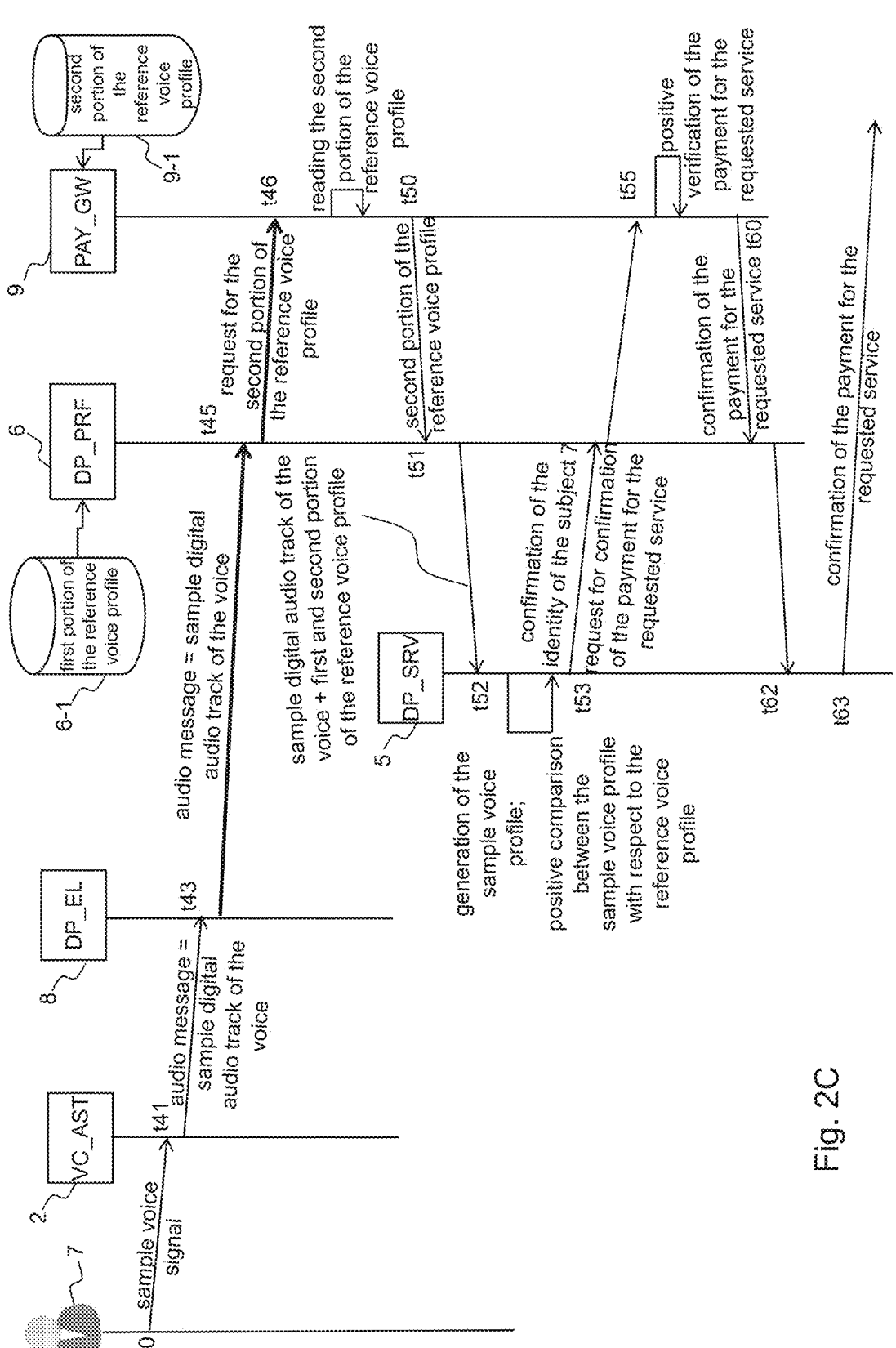
Figure 2D:
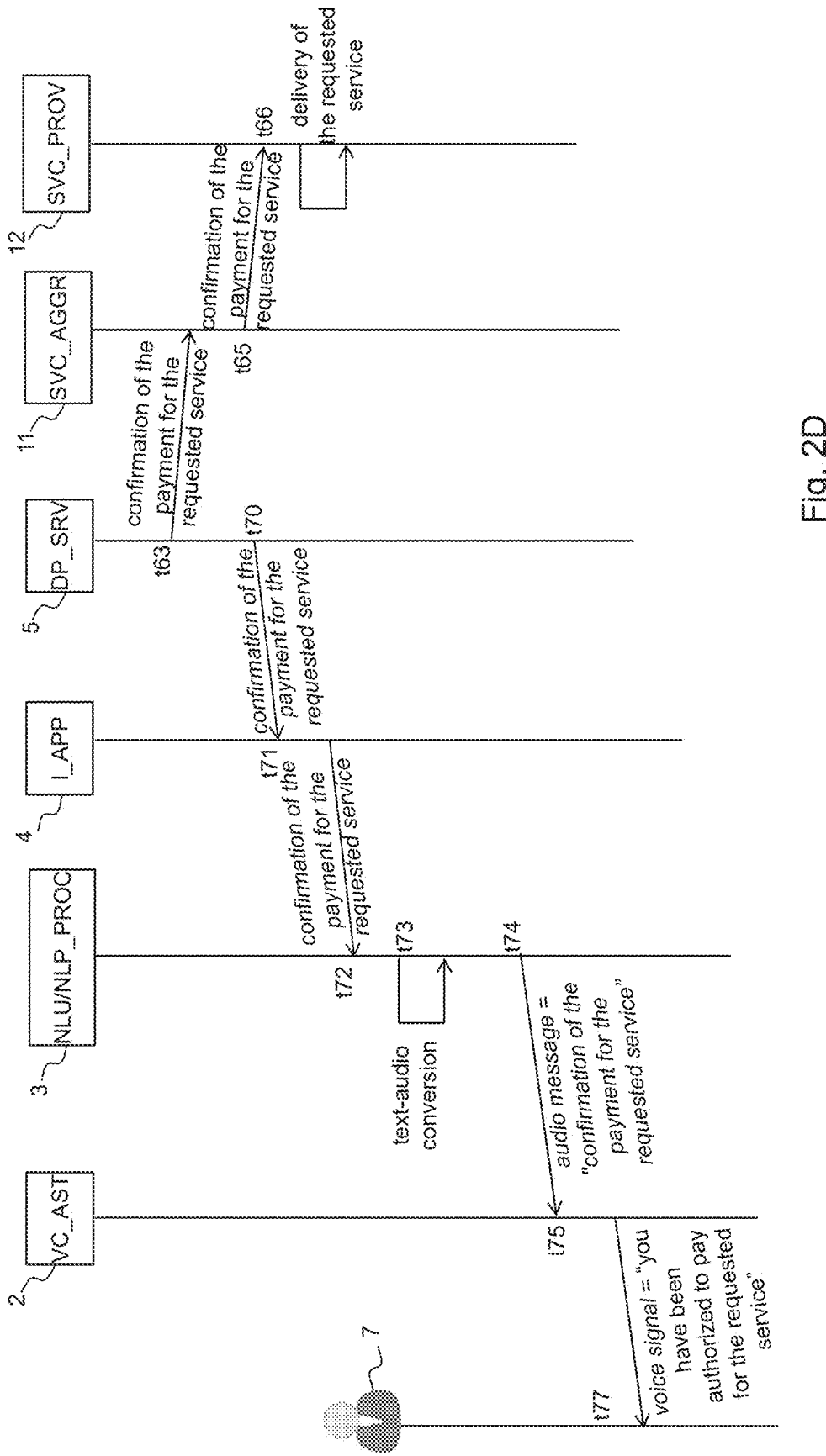

For the purpose of the explanation of the disclosure, it is considered FIGS. 2A-2B which show the trend over time of the text and audio messages exchanged between the voice assistant 2, the electronic device 8, the human language electronic processor 3, the application for delivering services to be paid 4, the profile decoding and payment enabling server device 5, the profiling server device 6 and the payment server device 9 of the electronic system 1.

For the purposes of the explanation of the disclosure, the following hypotheses in FIGS. 2A-B are considered:

the electronic device 8 is a smartphone;

it is used a reference and sample profile of the voice type;

the voice assistant 2 is a software application installed on the smartphone and it is activated by voice saying a defined activation word;

it is used a platform based on AI, NLP and NLU technologies to implement the electronic processor 3 (indicated with NLP/NLU electronic processor 3);

the service requested by the subject 7 is the purchase of a medical examination in a catalogue on the external service provider 12;

it is presented the service aggregator 11;

the application for delivering services to be paid 4 is a new skill dedicated to booking medical examinations to be paid, it is connected to the voice assistant 2 and it is indicated below with "Medical skill";

the profile decoding and payment enabling server device 5 has the function of authorizing the payment and thus the delivering of the service;

the profiling server device 6 is an external application server which manages the onboarding and profiling of the customer and manages the reference and sample profiles;

the payment server device 9 is an application server located at the financial institution which manages payment systems.

At the instant t0 a profiling of the subject 7 has already been carried out (by means of the profiling server device 6), in particular the telephone number of the subject 7 has already been acquired and has been stored in a non-volatile memory of the profiling server device 6; moreover at the instant t0 the reference voice profile of the subject 7 has already been acquired and partly stored in the memory 6-1 of the profiling server device 6 and partly in the memory 9-1 of the payment server device 9.

At the initial instant t0, the subject 7 asks the voice assistant 2 a request for delivering a service to be paid.

In particular, the subject 7 generates the following voice message (i.e., a sound):

"Hey IIO, I want to buy a medical examination at the healthcare facility XYZ."

The voice assistant 2 receives (by means of the microphone integrated in the smartphone 8) said voice message at the instant t1 and subsequently transmits towards the electronic processor NLP/NLU 3 an audio message indicative of a request for delivering a service to be paid, in particular the purchase of a medical examination at the XYZ clinic.

At the instant t3 the NLP/NLU electronic processor 3 receives the audio message indicative of the request for delivering the service to be paid (medical examination) and at the instant t4 converts the audio message into a text message, then at the instant t5 the NLP/NLU electronic processor 3 transmits towards the Medical skill 4 said text message indicative of the request for delivering the service to be paid (medical examination).

At the instant t6 (subsequent to t5), the Medical skill 4 receives said text message indicative of the request for delivering the service to be paid (medical examination), then at the instant t7 (subsequent to t6) the Medical skill 4 transmits towards the profile decoding and payment enabling server device 5 a message indicative of a request for availability of the requested service to be paid (medical examination).

At the instant t8 (subsequent to t7) the profile decoding and payment enabling server device 5 receives said message indicative of the request for availability of the requested service to be paid (medical examination) and at the instant t9 forwards it to the service aggregator 11.

At the instant t10 (subsequent to t9) the service aggregator 11 receives said message indicative of the request for availability of the requested service to be paid (medical examination) or at the instant t11 forwards it to the external service provider 12.

At the instant t12 (subsequent to t11), the external service provider 12 verifies the availability of the requested service to be paid and the respective cost; in particular, it is successfully verified that the requested medical examination is available at the healthcare facility XYZ and also the cost of the medical examination and any additional information (e.g., the date and time of the medical examination, the name of the doctor, etc.).

At the instant t13 (subsequent to t12) the external service provider 12 transmits towards the service aggregator 11 a message indicative of a confirmation of availability of the requested service to be paid (medical examination) and indicative of a request for payment for the cost of the requested service (i.e., the cost of the medical examination): said message is then received and forwarded by the service aggregator 11, by the profile decoding and payment enabling server device 5 and by the Medical skill 4, up to the instant t16 to the NLP/NLU electronic processor 3.

At the instant t17, the NLP/NLU 3 electronic processor converts the text message into an audio message, then the NLP/NLU electronic processor 3 transmits towards the voice assistant 2 an audio message indicative of the availability of the requested service to be paid (medical examination) and indicative of the request for payment for the cost of the requested service (cost of the medical examination).

At the instant t18 (subsequent to t17) the voice assistant 2 receives said audio message indicative of the availability of the requested service to be paid (medical examination) and indicative of the request for payment for the cost of the requested service (cost of the medical examination), then the voice assistant 2 generates (by means of a speaker of the smartphone 8) towards the subject 7 a voice message (i.e., a sound) indicative of the availability of the requested service to be paid (medical examination) and indicative of the request for payment for the cost of the requested service (cost of the medical examination), such as the following voice message:

"Medical examination available, do you confirm the payment for 50 euros?"

At the instant t19 (subsequent to t18) the subject 7 receives said voice message, then at the instant t20 the subject 7 emits with his/her voice a sound saying a phrase indicative of a confirmation of the wish to pay for the requested service (medical examination) at the indicated cost, such as the following phrase:

"I confirm the payment for the medical examination at the cost of 50 euros".

In one embodiment, at the instant t20 a voice message representative of the confirmation of the wish to make the payment for the requested service is stored, and possibly the geographical position of the smartphone 8 of the subject 7 and/or the date/time is also stored.

At the instant t21 (subsequent to t20) the voice assistant 2 receives (by means of the microphone of the smartphone 8) the sound representative of the confirmation of the wish to pay for the requested service at the indicated cost and subsequently transmits towards the NLP/NLU electronic processor 3 an audio message indicative of said confirmation of the wish to pay for the requested service (medical examination) at the indicated cost.

At the instant t22 (subsequent to t21) the NLP/NLU electronic processor 3 receives the audio message indicative of said confirmation of the wish to pay for the requested service (medical examination) at the indicated cost and converts the audio message into a text message, then at the instant t23 the NLP/NLU electronic processor 3 transmits towards the Medical skill 4 said text message indicative of the confirmation of the wish to pay for the requested service (medical examination) at the indicated cost.

At the instant t24 (subsequent to t23) the Medical skill 4 receives said text message indicative of the confirmation of the wish to pay for the requested service (medical examination) at the indicated cost, at the instant t25 (subsequent to t24) the Medical skill 4 transmits towards the profile decoding and payment enabling server device 5 a message indicative of a request for payment for the requested service (medical examination).

At the instant t26 (subsequent to t25) the profile decoding and payment enabling server device 5 receives the text message indicative of the request for payment for the requested service (medical examination), then at the instant t27 (subsequent to t26) the profile decoding and payment enabling server device 5 transmits towards the profiling server device 6 a message indicative of a request to enable the payment for the service.

In one embodiment, at the instant t26 the voice message representative of the confirmation of the wish to pay for the requested service is stored (in a memory of the profile decoding and payment enabling server device 5), and possibly the geographical position of the smartphone 8 of the subject 7 and/or the date/time is also stored.

At the instant t28 (subsequent to t27) the profiling server device 6 receives said message indicative of the request to enable the payment for the service (digital book) and at the instant t29 activates a procedure for verifying the identity of the subject 7, by means of the use of the voice profile.

In particular, at the instant t30 (subsequent to t29) the profiling server device 6 transmits towards the smartphone 8 a request for acquiring the sample voice profile of the subject 7, wherein said request for acquiring the sample voice profile is supposed to be implemented by means of a voice call or a text message from the profiling server device 6 to the smartphone 8 of the subject 7, using the telephone number associated with the SIM card fitted in the smartphone 8 and acquired by the subject 7 in the previous profiling step.

At the instant t31 (subsequent to t11) the electronic device 8 receives the message of the request to acquire the sample voice profile of the subject 7, in particular by means of a voice call or a text message, then the smartphone 8 transmits to the voice assistant 2 an audio message indicative of a request to say a defined phrase, such as the following phrase in the example considered for the medical examination:

"Hello, do you want to pay the cost of 50 euros for the medical examination at the facility XYZ with Voice-Pay? The subject must answer with the word YES or NO, followed by the phrase I AM NAME and SUR-NAME and THIS IS MY VOICE".

Therefore, in this example the defined phrase (i.e., known in advance) is "I am Name and Surname and this is my voice".

For simplicity's sake it has been assumed that there is only one defined phrase, but more generally it is possible to address to the subject 7 more than one predefined phrase and therefore receive more than one response from the subject 7.

At the instant t32 the voice assistant 2 receives the audio message indicative of the request to say the defined phrase, then generates (by means of the speaker of the smartphone 8) towards the subject 7 a voice message (i.e., a sound) indicative of the request to say the defined phrase.

At the instant t33 the subject 7 receives said voice message indicative of the request to say the defined phrase and at the instant t40 the subject 7 emits with the voice a sound saying the requested phrase (i.e., "I am Name and Surname and this is my voice"), which will be used to generate the sample voice profile of the subject 7.

Alternatively, a defined phrase is not used to acquire the sample voice signal representative of the voice of the subject 7, but at the instant t30 the profiling server device 6 transmits towards the smartphone 8 a text message containing an alphanumeric code (i.e., a PIN) and the subject 7 is asked to read aloud the value of the alphanumeric code received, therefore at the instant t33 the subject 7 receives the following voice message in the example considered for the medical examination: "Hello, do you want to pay the cost of 50 euros for the medical examination at the facility XYZ with VoicePay? The subject must answer with the word YES or NO, then say the code contained in the message received".

At the instant t41 the voice assistant 2 acquires (by means of the microphone of the smartphone 8) the voice signal representative of the defined phrase (or the value of the alphanumeric code) said by the subject 7, then an analog to digital conversion of the acquired voice signal is carried out and a digital audio track representative of the voice of the subject 7 is generated therefrom, then said digital audio track sample is forwarded by the voice assistant 2 to the smartphone 8.

At the instant t43 the smartphone 8 receives the sample digital audio track representative of the voice and transmits towards the profiling server device 6 an audio message carrying the sample digital audio track representative of the voice of the subject 7, wherein said audio track is for example a wave, mp3 or ogg format.

At the instant t45 the profiling server device 6 receives the audio message of the sample digital audio track representative of the voice of the subject 7 and temporarily stores it in the memory 6-1, then the profiling server device 6 transmits towards the payment server device 9 a message indicative of a request for a second portion of the reference voice profile of the subject 7.

At the instant t46 (subsequent to t45) the payment server device 9 receives the message indicative of the request for the second portion of the reference voice profile, reads from the memory 9-1 thereof the second portion of the reference voice profile and at the instant t50 (subsequent to t46) transmits towards the profiling server device 6 a message carrying the second portion of the reference voice profile (for example, an alphanumeric code generated with a hash algorithm).

At the instant t51 the profiling server device 6 receives the message carrying the second portion of the reference voice profile, reads from the memory 6-1 thereof the first portion of the reference voice profile and subsequently the profiling server device 6 transmits towards the profile decoding and payment enabling server device 5 a message carrying the digital audio track representative of the voice of the subject 7, together with the first and second portion of the voice profile of the subject 7.

At the instant t52 the profile decoding and payment enabling server device 5 receives the message carrying the sample digital audio track representative of the voice of the subject 7 and generates therefrom the sample voice profile; for example, the processing unit of the profile decoding and payment enabling server device 5 generates a sample alphanumeric code with a hash algorithm as a function of the sample digital audio track representative of the voice of the subject 7 which previously said the defined phrase.

Furthermore, at the instant t52, the profile decoding and payment enabling server device 5 receives the first and second portion of the reference voice profile, then the profile decoding and payment enabling server device 5 decodes the first and second portion of the reference voice profile and recomposes the first and second portion of the reference voice profile, regenerating the reference voice profile therefrom; in particular, a random hash algorithm is used to generate a reference alphanumeric code associated with the reference voice profile, as a function of the two reference alphanumeric codes associated with the first and second portion of the reference voice profile.

The term "random algorithm" means that each time the reference voice profile is generated as a function of the first and second portion of the reference voice profile, the hash function used to generate the alphanumeric code associated with the first portion of the reference voice profile and the alphanumeric code associated with the second portion of the reference voice profile is changed, thus generating two different alphanumeric codes each time, as long as the final result (i.e., the alphanumeric code associated with the reconstructed reference voice profile) always has the same value for the same reference biometric voice information.

Therefore the profile decoding and payment enabling server device 5 generates in clear the personal data of the subject 7 in order to verify the identity thereof, but the profile decoding and payment enabling server device 5 does not store the reference voice (or voice/face) profile of the subject 7, which is instead stored partly in the memory 6-2 associated with the profiling server device 6 and partly in the memory 9-1 associated with the payment server device 9.

Furthermore, the identity of the subject 7 is also in clear to the payment server device 9, which must know the identity of the person requesting the payment, in order to verify if he/she is present in the CRM thereof.

Subsequently, the profile decoding and payment enabling server device 5 compares the sample voice profile and the reference voice profile, in order to verify if they are compatible with each other (i.e., if both belong to the same person, i.e., the subject 7); in particular, a comparison is performed between the sample alphanumeric code (associated with the sample voice profile with a hash function) and the reference alphanumeric code (associated with the reference voice profile with the hash function).

It is assumed that the comparison is positive, i.e., that the profile decoding and payment enabling server device 5 detects (by means of the processing unit thereof) that the sample voice profile is compatible with the reference voice profile: in this case, at the instant t53 the profile decoding and payment enabling server device 5 transmits towards the profiling server device 6 a message indicative of a confirmation of the identity of the subject 7 and indicative of a request for confirmation of the payment for the requested service, then said message is received by the profiling server device 6 and is forwarded to the payment server device 9.

Therefore the payment server device 9 receives (from the profile decoding and payment enabling server device 5) in clear the personal data of the subject 7, in order to verify (for example in a CRM) whether the subject is authorized to pay for the requested good or service.

At the instant t55 (subsequent to t53) the payment server device 9 performs a verification if the subject 7 is authorized to make the payment for the requested service, in particular if the subject 7 is authorized to pay 50 euros to book the medical examination at the healthcare facility XYZ.

For example, the payment server device 9 uses a Paypal or Amazon Pay or Apple Pay payment system, which can be the same or different from the payment system used by the profile decoding and payment enabling server device 5.

It is assumed that said verification carried out on the payment server device 9 is positive, i.e., that the payment server device 9 has verified that the subject 7 is authorized to make the payment for the requested service with the payment system associated with the payment server device 9 (i.e., there are sufficient funds in the Paypal account or Amazon Pay or Apple Pay associated with the subject 7): therefore, at the instant t60 the payment server device 9 transmits towards the profiling server device 6 a message indicative of a confirmation of payment for the requested service (for example, a booking confirmation and payment for the medical examination), then said message is forwarded from the profiling server device 6 to the profile decoding and payment enabling server device 5.

At the instant t62 the profile decoding and payment enabling server device 5 receives the message indicative of the confirmation of payment for the requested service, then at the instant t63 the profile decoding and payment enabling server device 5 transmits towards the service aggregator 11 a message indicative of the confirmation of payment for the requested service, then said message is forwarded to the external service provider 12, wherein the requested service is actually delivered at the instant t66.

In the example considered of the medical examination, the external service provider 12 sends the smartphone 8 a link at which the subject 7 receives confirmation of payment and receipt of the purchased service.

Furthermore, at the instant t70 the profile decoding and payment enabling server device 5 transmits towards the application for delivering services to be paid 4 a message indicative of a confirmation of the payment for the requested good or service (medical examination).

It should be noted that after enabling the profile decoding and payment enabling server device 5 to make the payment for the requested service, the algorithm used to regenerate the reference voice profile is changed as a function of the first and second portion of the reference voice profile: therefore in the case of a new request for delivering a good or service to be paid by the same subject 7, another algorithm will be used to regenerate the reference profile, always obtaining the same reference voice profile.

At the instant t71, the application for delivering services to be paid 4 receives the message indicative of the confirmation of payment for the requested service (medical examination) and transmits a text message indicative of the confirmation of payment for the requested service to the NLP/NLU electronic processor 3.

At the instant t73, the NLP/NLU electronic processor 3 receives the text message indicative of the confirmation of payment for the requested service (medical examination) and converts the text message into an audio format, then at the instant t74 the NLP/NLU electronic processor 3 transmits towards the voice assistant 2 an audio message indicative of the confirmation of payment for the requested service (medical examination).

At the instant t75 (subsequent to t38) the voice assistant 2 receives said audio message indicative of the confirmation of the payment for the requested service (medical examination), then the voice assistant 2 generates (by means of the speaker integrated in the smartphone 8) a voice signal (i.e., a sound) indicative of the confirmation of the payment for the requested service (digital book), such as the following phrase:

"You are authorised to pay for the medical examination no. 1234 for 3 May at the healthcare facility XYZ".

It should be noted that for simplicity's sake in the first embodiment the case has been considered in which the reference voice profile has been divided into two portions stored in respective network server devices, but more generally the reference voice profile can be divided into two or more distinct portions stored in two or more corresponding network server devices.

According to a first variant of the operation of the first embodiment illustrated above in FIGS. 2A-2D, the face profile of the subject 7 is used in addition to the voice profile, in order to enable or deny the payment for the requested service: in this way the security level of the verification step of the identity of the subject 7 is increased.

According to said first variant of the first embodiment, in the profiling step an image representative of the face (or a part thereof) of the subject 7 was acquired (by means of a camera of the smartphone 8), then this image is used by the profiling server device 6 to generate a reference face profile of the subject 7, in addition to the reference voice profile, hence it will be indicated later with reference voice/face profile: said reference voice/face profile will be stored partly in the memory 6-1 of the profiling server device 6 and partly in the memory 9-1 of the payment server device 9.

The operation of said first variant is similar to that illustrated above, with the difference that a reference voice/face profile is used (instead of a reference voice profile) and also a sample voice/face profile is used (instead of a sample voice profile), in particular the following differences are highlighted:

at the instant t30, the profiling server device 6 transmits towards the electronic device 8 a message indicative of a request to acquire a sample face profile, in addition to the request to acquire the sample voice profile, which will be indicated with sample voice/face profile;

at the instant t31, the smartphone 8 receives the message requesting acquisition of the sample voice/face profile of the subject 7;

at the instant t32 the voice assistant 2 receives the audio message indicative of the request to say the defined phrase and to take a photo (selfie) of the face of the subject 7, such as: "Hello, do you want to pay the cost of 50 euros for the medical examination at the facility XYZ with VoicePay? The subject must answer with the word YES or NO, followed by the phrase I AM NAME and SURNAME and THIS IS MY VOICE, furthermore the subject must take a selfie";

at the instant t43, the smartphone 8 acquires (by means of the front camera) a selfie of the face of the subject 7 and transmits towards the profiling server device 6 a multimedia message (i.e., audio-video) carrying the sample digital audio track representative of the voice of the subject 7 and carries the image representative of the face of the subject 7;

at the instant t52, the profile decoding and payment enabling server device 5 compares the sample voice/face profile and the reference voice/face profile, in order to verify if they are compatible with each other.

According to a second variant of the operation illustrated above in FIGS. 2A-2D, an OTP code sent by the profiling server device 6 to the smartphone 8 is also used (in addition to the voice profile), in order to verify the identity of the subject 7 using a double authentication factor thus increasing security, in the case where for example it is not possible compare the sample and reference voice profiles, due to noise during the acquisition of the sample voice signal representative of the voice of the subject 7.

According to a third variant of the operation illustrated above in FIGS. 2A-2D, the sample face profile (instead of the sample voice profile), in combination with the OTP code, is used in order to verify the identity of the subject 7 using a double authentication factor.

According to a further embodiment of the disclosure, a voice signature is used in the electronic system 1, which is added after the authorization granted to make the payment for the requested good or service (i.e., subsequent to the instant t77).

For example, the requested service to be paid is the purchase of an insurance policy for a motor vehicle with a limited duration (a few hours), which requires an electronic signature of the subject 7: the driver of the motor vehicle purchases the policy while driving the vehicle, using only voice commands and virtually signing the policy with the voice signature.

Another example is the purchase of a financial product, which requires an electronic signature of the purchase contract, which is implemented with the voice signature.

The voice signature is implemented by storing, during a profiling procedure prior to normal operation, a reference digital audio track representative of the voice of the subject 7 associated with two or more defined words; during the normal operation step, the sample voice signal associated with said two or more defined words is acquired in real time, in order to compare the sample voice profile with respect to the reference voice profile of the two or more defined words.

In particular, the operation of the electronic system 1 continues (subsequent to the instant t77) in the following manner:

the voice assistant 2 generates (by means of the speaker of the smartphone 8) towards the subject 7 a voice message (i.e., a sound) indicative of a request to confirm the payment for the good or service with a voice signature;

the subject 7 receives said voice message indicative of the request for confirmation with voice signature and awaits instructions;

the voice assistant 2 generates (by means of the speaker of the smartphone 8) towards the subject 7 a voice message (i.e., a sound) indicative of a request to say one or more defined words (i.e., known in advance), based on the level of security requested;

the subject 7 receives said voice message indicative of the request to say one or more words, then the subject 7 emits a sound with the voice saying the requested words;

the profile decoding and payment enabling server device receives the sample digital audio track representative of the requested words and compares the sample digital audio track and the previously stored reference digital audio track representative of the same requested words;

if the comparison between the sample and reference digital audio track is positive, the electronic system 1 approves the payment transaction;

if the comparison between the sample and reference digital audio track is negative, an OTP code is sent from the profiling server device 6 to the smartphone 8;

if the comparison of the OTP code is positive, the electronic system 1 approves the payment transaction;

if the comparison of the OTP code is negative, the electronic system 1 rejects the payment transaction.

In one embodiment, the voice of the subject 7 is recorded during the acquisition step of the voice signature, and possibly the storage of the geographical position of the electronic device 8 of the subject 7 and/or date/time.

It should be noted that for the purposes of explaining the disclosure an integrated voice assistant 2 has been considered as software installed in the electronic device 8 of the mobile type, but the disclosure is also applicable in the case where the voice assistant 2 is installed on a personal computer or on an IOT (Internet-of-things) device or in the case where the voice assistant 2 is a dedicated electronic device separate from the electronic device 8 typically of the mobile type (smartphone or tablet).

It should be noted that the disclosure is also applicable to enable payment for a good or service using two different payment systems, i.e., the profile decoding and payment enabling server device 5 uses a payment system which is different from that used by the payment server device 9.

For example, in the case where the electronic device 8 is an iPhone, the profile decoding and payment enabling server device 5 uses Apple Pay, while the payment server device 9 uses the Amazon Pay or Paypal payment system.

Figure 3:
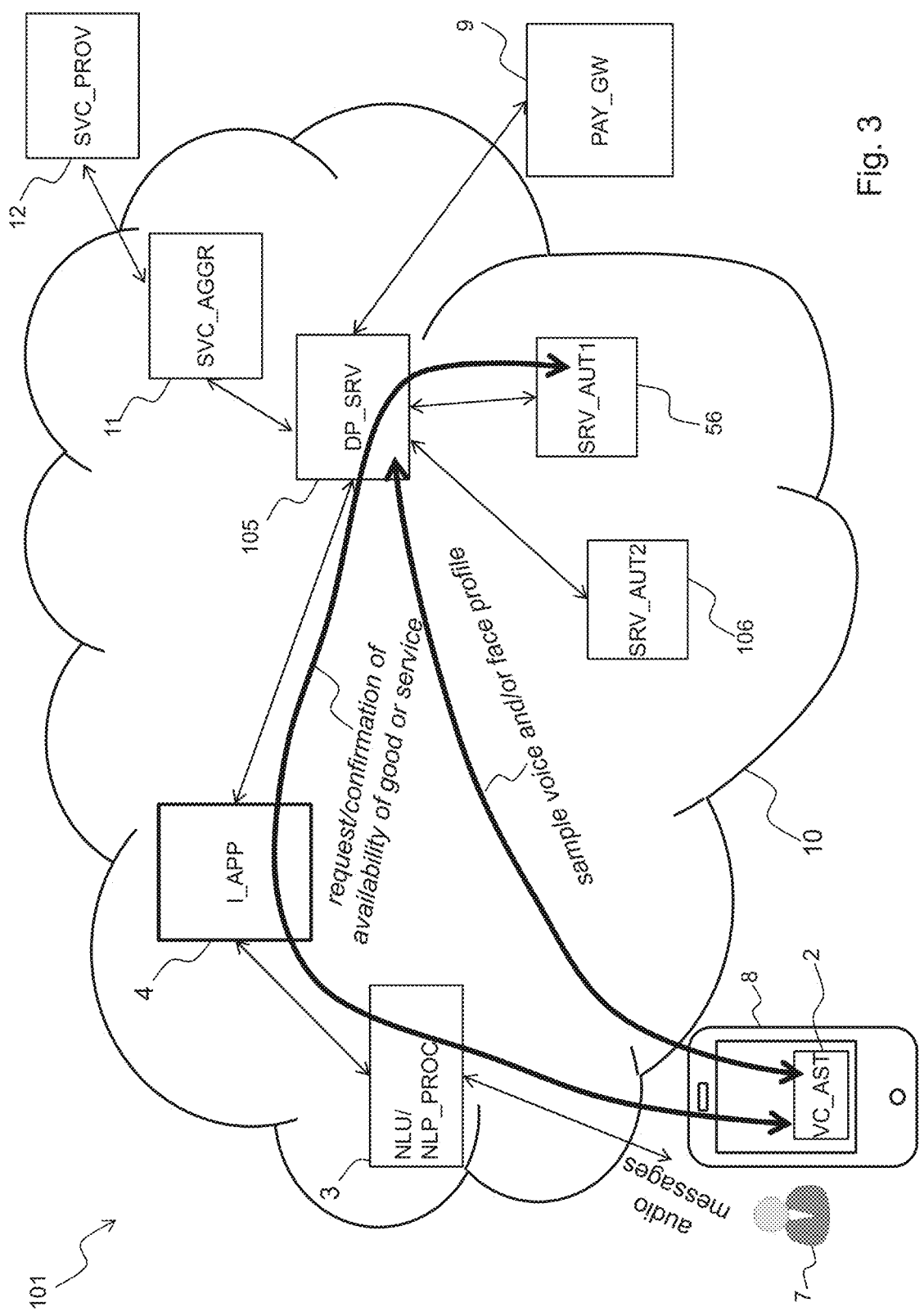
FIG. 3 shows a block diagram of an electronic system for enabling payment of a good or service by means of voice commands according to a second embodiment of the disclosure.

With reference to FIG. 3, it shows a block diagram of an electronic system 101 for enabling payment of a good or service by means of voice commands according to a second embodiment of the disclosure.

The electronic system 101 of FIG. 3 differs from the electronic system 1 of FIG. 1 in that it comprises a first authentication server device 56 in place of the profiling server device 6, because the first authentication server device 56 performs some functionalities different with respect to the profiling server device 6.

Similarly, the electronic system 101 comprises an operative server device 105 in place of the server device 5, because the operative server device 105 performs some functionalities different with respect to the server device 5.

Furthermore, the electronic system 101 of FIG. 3 differs from the electronic system 1 of FIG. 1 in that it further comprises a second authentication server device 106, in addition to the first authentication server device 56: therefore in this case the second portion of the reference voice profile is stored in the second authentication server device 106, instead of in the payment server device 9.

In the second embodiment, the operative server device 105 is connected, through the telecommunications network 10, to both the first authentication server device 56, and to the second authentication server device 106, as well as to the payment server device 9.

With reference to FIGS. 4A-4D, they show a trend over time of the messages exchanged between the different components of the electronic system 1 of the second embodiment of the disclosure.

Figure 4A:
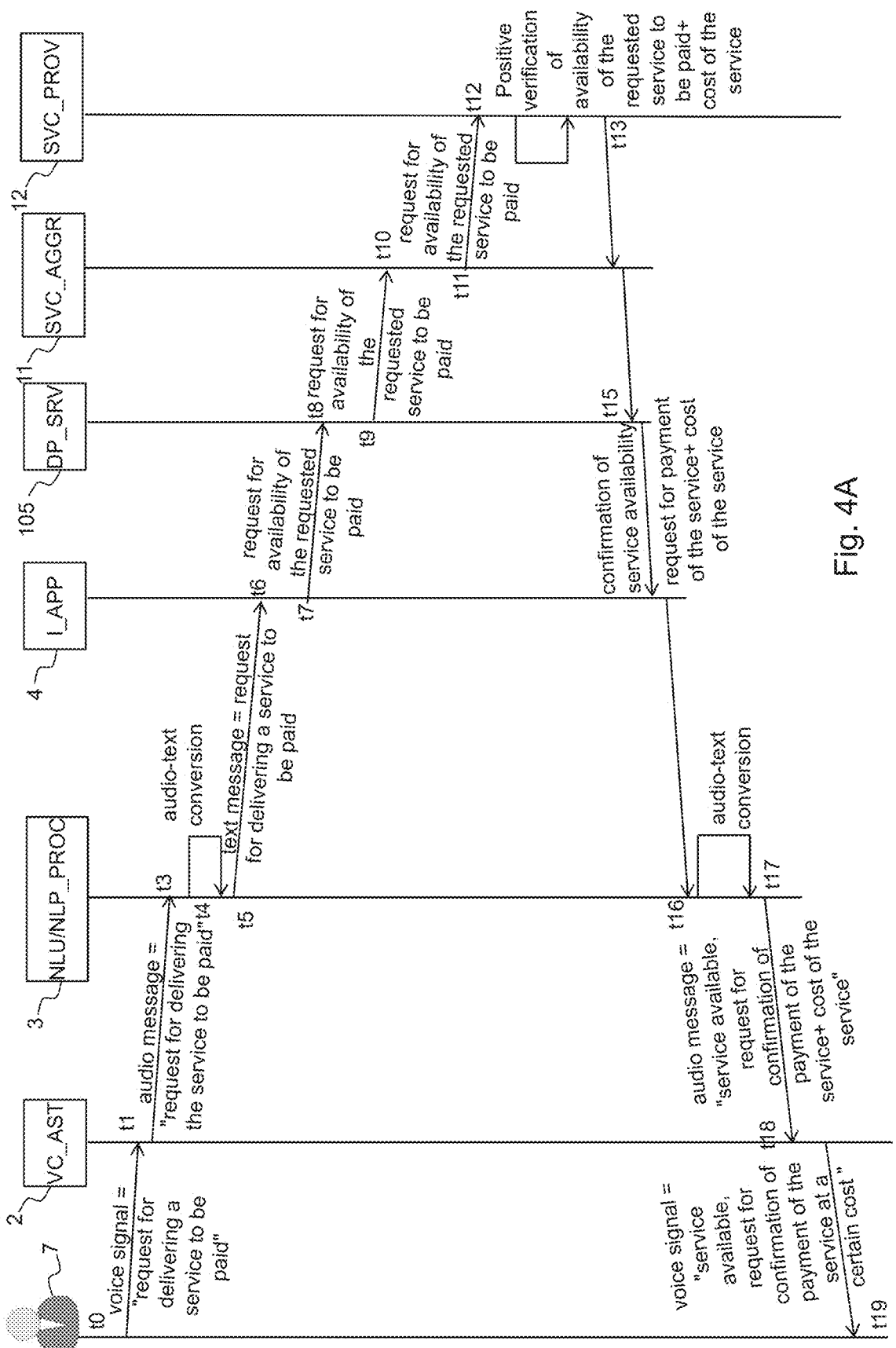
FIGS. 4A-4D show a time trend of the messages exchanged among the different components of the system of the second embodiment of the disclosure.

The operation of the electronic system 1 of the second embodiment is the same as the operation of the electronic system 1 of the first embodiment up to the instant t19, i.e., the operation shown in FIG. 2A is also applicable to the second embodiment, with the difference that in FIG. 4A there is the operative server device 105 in place of the server device 5 of FIG. 2A.

Figure 4B:
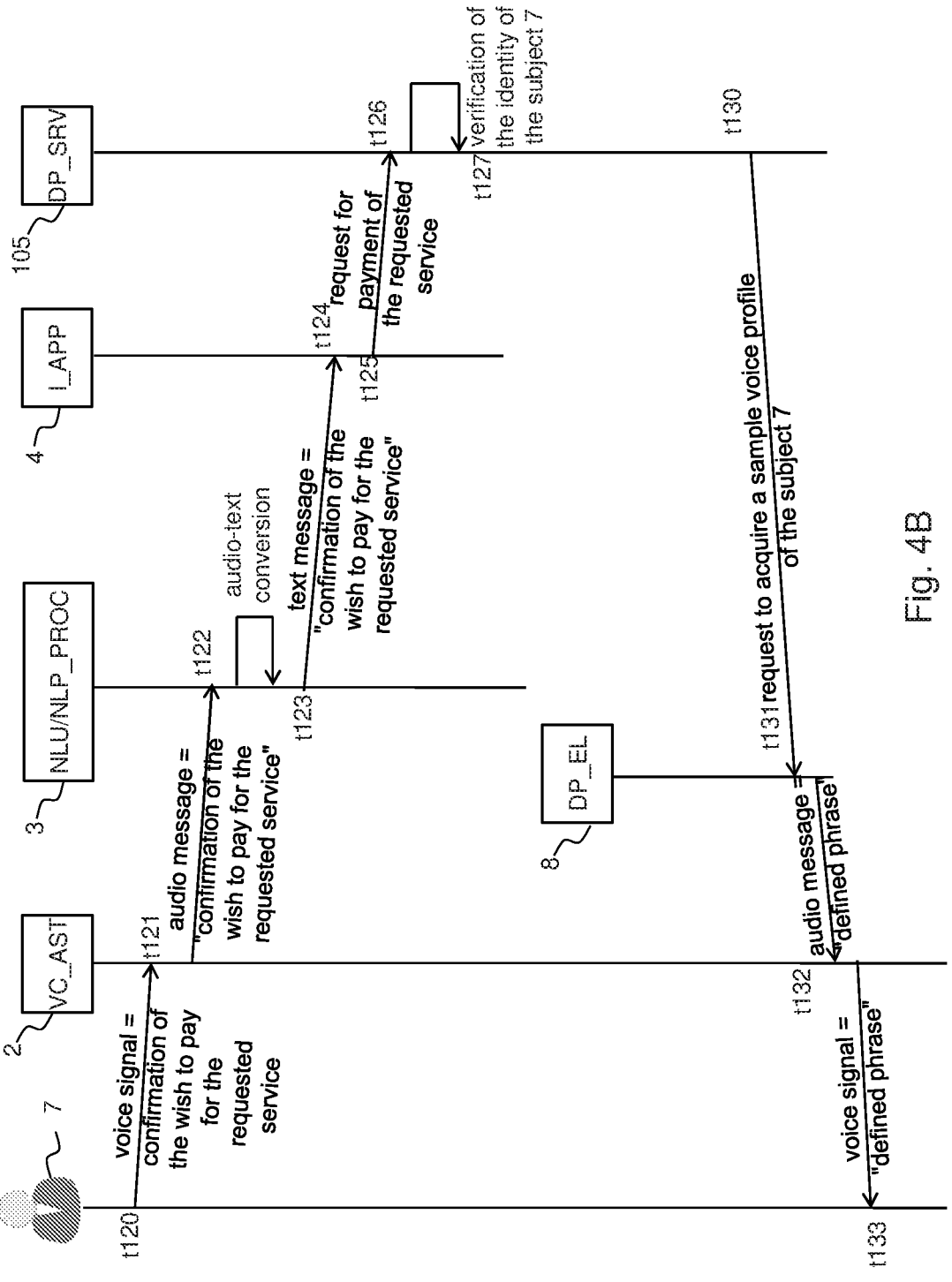
Figure 4C:
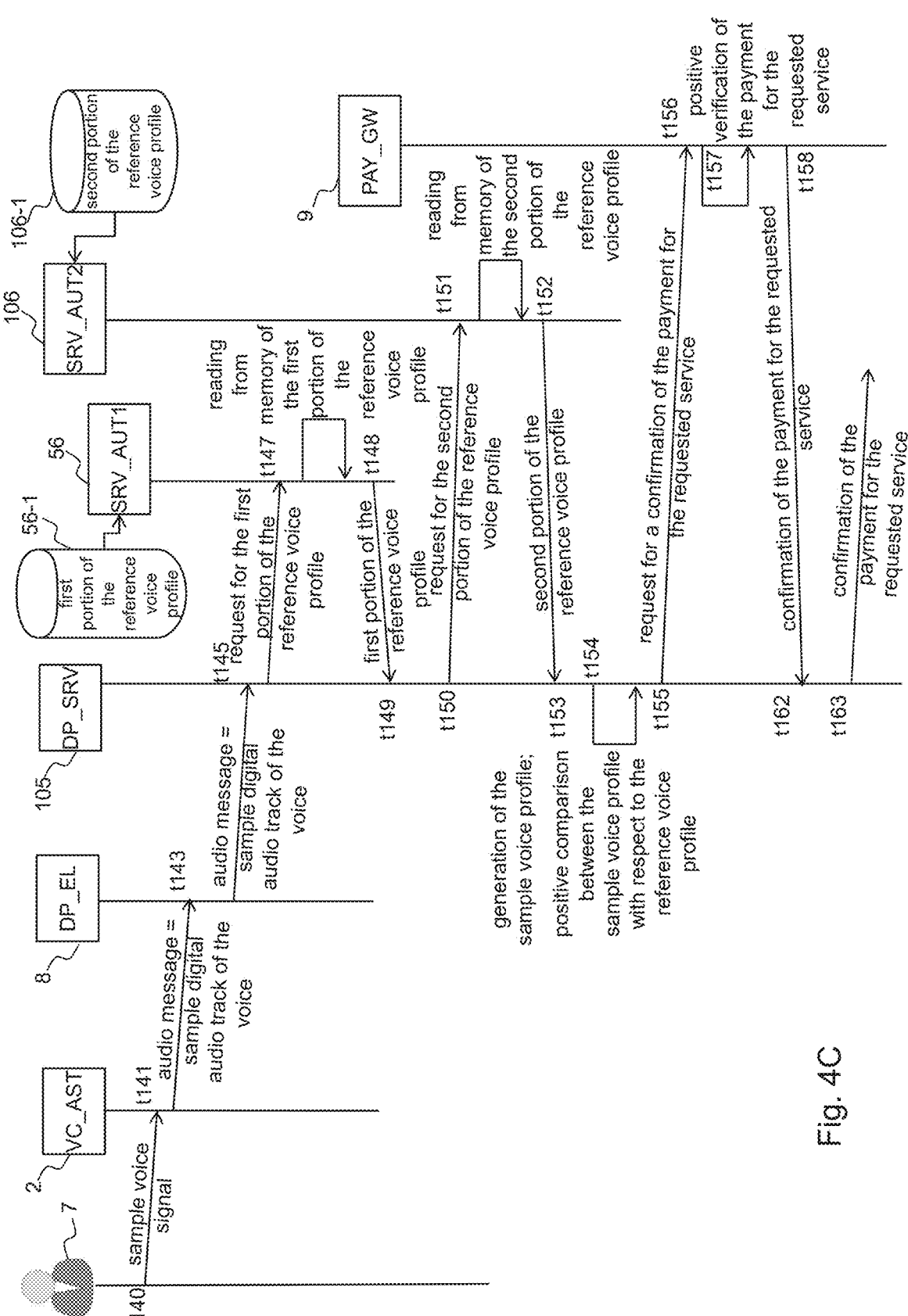
Figure 4D:
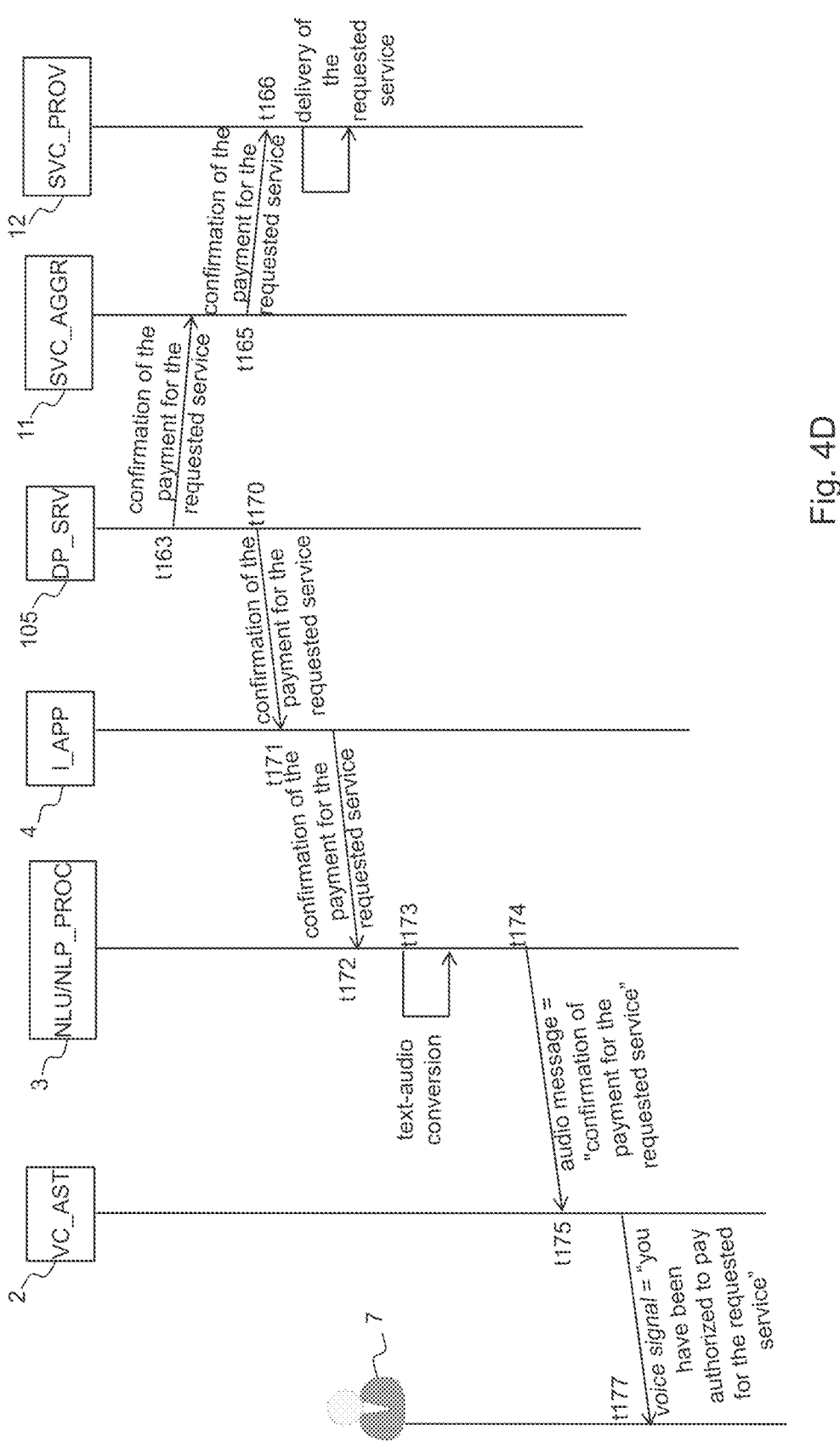

Subsequently to the instant t19, the operation of the second embodiment continues as shown in FIGS. 4B-4D and differs from the operation of the first embodiment for the following differences:

the verification of the identity of the subject 7 is performed in the operative server device 105 instead of in the profiling server device 6, that is the latter is functionally incorporated within the operative server device 105;

in the operative server device 105 it is performed a comparison between the sample voice profile and the reference voice profile acquired in a previous profiling procedure in a security condition.

In particular, the operation between the instant t120 (subsequent to t19) and the instant t126 is the same as that illustrated between the instants t20 and t26 for the first embodiment of FIG. 2B.

At the instant t126 (subsequent to t125) the operative server device 105 receives the text message indicative of the request for payment for the requested service (medical examination) and at the instant t127 (subsequent to t126) a procedure for verifying the identity of the subject 7 is activated in the operative server device 105, by means of the use of the voice profile, similar to that illustrated for the instant t28 for the first embodiment of the disclosure.

In particular, at the instant t130 (subsequent to t127) the operative server device 105 transmits towards the smartphone 8 an acquisition request for the sample voice profile of the subject 7, wherein said acquisition request for the sample voice profile is supposed to be implemented by means of a voice call or a text message from the operative server device 105 to the smartphone 8 of the subject 7, using the telephone number associated with the SIM mounted into the smartphone 8 and acquired by the subject 7 in the previous profiling step.

At the instant t131 (subsequent to t130) the electronic device 8 receives the message of the acquisition request for the sample voice profile of the subject 7, in particular by means of a voice call or a text message, then the smartphone 8 transmits to the voice assistant 2 an audio message indicative of a request to say a defined phrase.

At the instant t132 the voice assistant 2 receives the audio message indicative of the request to say the defined phrase, then generates (by means of the speaker of the smartphone 8) towards the subject 7 a voice message (i.e., a sound) indicative of the request to say the defined phrase.

At the instant t133 the subject 7 receives said voice message indicative of the request to say the defined phrase and at the instant t240 the subject 7 emits with the voice a sound saying the requested phrase, which will be used to generate the sample vector feature associated with the subject 7.

At the instant t140 (subsequent to t133) the subject 7 emits with the voice a sound by saying a defined phrase or by reading aloud the value of an alphanumeric code received, then at the instant t141 the voice assistant 2 acquires (by means of the microphone of the smartphone 8) the sound representative of the defined phrase (or the value of the alphanumeric code) said by the subject 7, then an analog-to-digital conversion of the acquired voice signal is performed and a sample digital audio track representative of the voice of the subject is generated therefrom, then said sample digital audio track is forwarded by the voice assistant 2 to the smartphone 8.

At the instant t143 the smartphone 8 receives the sample digital audio track representative of the voice of the subject 7 and transmits towards the operative server device 105 an audio message carrying the sample digital audio track representative of the voice of the subject 7.

At the instant t145 the operative server device 105 receives the audio message representative of the sample digital audio track representative of the voice of the subject 7 and temporarily stores it in an internal memory or a memory associated therewith, then the operative server device 105 transmits towards the first authentication server device 56 a message indicative of a request for a first portion of the reference voice profile of the subject 7.

At the instant t147 (subsequent to t145) the first authentication server device 56 receives the message indicative of the request for the first portion of the reference voice profile, reads from the memory 56-1 thereof the first portion of the reference voice profile and at the instant t148 (subsequent to t147) transmits towards the operative server device 105 a message carrying the first portion of the reference voice profile (e.g., an alphanumeric code generated with a hash function).

At the instant t149 (subsequent to t148) the operative server device 105 receives the message carrying the first portion of the reference voice profile and temporarily stores it in an internal memory or a memory associated therewith.

Similarly, at the instant t 150 (subsequent to t145) the operative server device 105 transmits towards the second authentication server device 106 a message indicative of a request for a second portion of the reference voice profile of the subject 7.

At the instant t151 (subsequent to t150) the second authentication server device 106 receives the message indicative of the request for the second portion of the reference voice profile, reads from the memory 106-1 thereof the second portion of the reference voice profile and at the instant t152 (subsequent to t151) transmits towards the operative server device 105 a message carrying the second portion of the reference voice profile (e.g., an alphanumeric code generated with a hash function).

At the instant t153 (subsequent to t152) the operative server device 105 receives the message carrying the second portion of the reference voice profile and temporarily stores it in an internal memory or a memory associated therewith.

It should be noted that for simplicity FIG. 4A shows that the first portion of the reference voice profile is first requested and then the second portion of the reference voice profile, but it is also possible to reverse the two requests (i.e., the second portion of the reference voice profile is first requested and then the first portion of the reference voice profile) or the two requests are performed simultaneously.

Similarly, FIG. 4A shows for simplicity's sake that the first portion of the reference voice profile is first received by the operative server device 105 and then the request for the second portion of the reference voice profile is transmitted, but it is also possible to transmit the request for the second portion of the reference voice profile before the first portion of the reference voice profile is received by the operative server device 105.

At the instant t154 (subsequent to t153) the operative server device 105 generates a sample voice profile as a function of the sample audio track representative of the voice of the subject 7.

It should be noted that the sample voice profile may alternatively be generated at the previous instant t145 in which it is received at the operative server device 105.

Subsequently, the operative server device 105 decodes the first and second portion of the reference voice profile and recomposes the first and second portion of the reference voice profile, regenerating the reference voice profile therefrom; in particular, a random algorithm is used to generate a reference alphanumeric code associated with the reference voice profile with a hash function, as a function of the two reference alphanumeric codes associated with the first and second portion of the reference voice profile with the hash function.

Subsequently, the operative server device 105 performs a comparison between the sample voice profile and the reference voice profile, in order to verify whether they are compatible with each other (i.e., if they both belong to the same person, i.e., the subject 7); in particular, a comparison is performed between the sample alphanumeric code (associated with the sample voice profile) and the reference alphanumeric code (associated with the reference voice profile).

It is assumed that the comparison is positive, i.e., that the operative server device 105 detects (by means of the processing unit thereof) that the sample voice profile is compatible with the reference voice profile: in this case, at the instant t155, the operative server device 105 transmits towards the payment server device 9 a message indicative of a request for confirmation of payment for the requested service.

At the instant t156 (subsequent to t155) the payment server device 9 receives the message indicative of the request for confirmation of payment for the requested service and at the instant t157 the payment server device 9 verifies whether the subject 7 is authorized to make the payment for the requested service.

It is assumed that said verification performed at the payment server device 9 is positive, i.e., that the payment server device 9 has verified that the subject 7 is authorized to make the payment for the requested service with the payment system associated with the payment server device 9: therefore at the instant t158 the payment server device 9 transmits towards the operative server device 105 a message indicative of a confirmation of the payment for the requested service.

At the instant t162 the operative server device 105 receives the message indicative of the confirmation of the payment for the requested service, then at the instant t163 the operative server device 105 transmits towards the service aggregator 11 a message indicative of the confirmation of the payment for the requested service, then said message is forwarded to the external service provider 12, wherein the requested service is actually delivered at the instant t166.

The operation between the instants t170 and t177 is the same as that illustrated above between the instants t70 and t77 for the first embodiment.

It should be noted that for simplicity's sake in the second embodiment the case has been considered in which the reference voice profile has been divided into two portions stored into respective network server devices 56, 106, but more generally the reference voice profile can be divided into two or more distinct portions stored into two or more corresponding network server devices.

Figure 5:
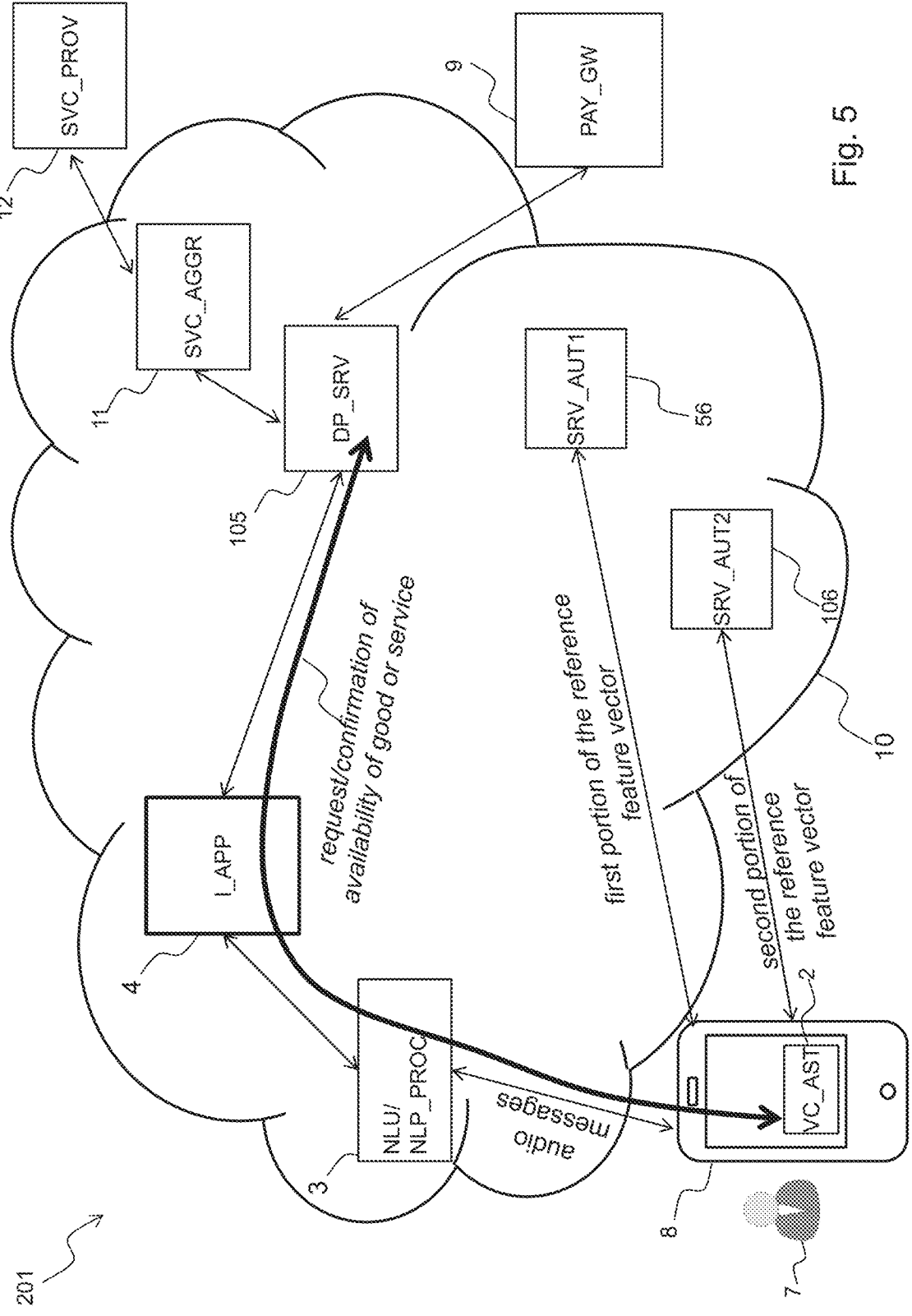
FIG. 5 shows a block diagram of the electronic system for enabling payment of a good or service by means of voice commands according to a third embodiment of the disclosure.

With reference to FIG. 5, it shows a block diagram of an electronic system 201 for enabling payment of a good or service by means of voice commands according to a third embodiment of the disclosure.

The electronic system 201 of FIG. 5 differs from the electronic system 101 of FIG. 3 in that the smartphone 8 is configured to generate a "sample feature vector" as a function of an analog voice signal (i.e., an analog audio track) representative of the voice of the subject 7 and in that it is performed a comparison between the "sample feature vector" and a "reference feature vector" (instead of a comparison between a sample voice profile and a reference voice profile), wherein said comparison is performed in the smartphone 8 (instead of the comparison of the voice profiles in the server device 5): in this way it is avoided to transmit the sample digital audio track representative of the voice of the subject 7 from the smartphone 8 to the telecommunications network 10, because two portions of the "reference feature vector" are transmitted which are anonymous (i.e., which are not easily associated with a particular user), thus increasing the security of the transmitted data with respect to the possible interception of the data in transit by malicious persons.

The term "sample feature vector" means a binary code representative of the digital identity of the subject 7 and uniquely associated with the analog voice signal acquired in real time from the subject 7 and representative of the voice of the subject 7.

In particular, the sample feature vector is generated by means of an algorithm which encodes in binary the distinctive features of the voice of the subject 7, such as one or more of the following features of the voice of the subject 7:

the voiceprint of the subject 7;
height (pitch) of the voice of the subject 7;
intensity (loudness) of the voice of the subject 7;
frequency of the voice of the subject 7;
bandwidth of the voice of the subject 7;
clarity of the voice of the subject 7, i.e., the power of the acoustic signal at high frequencies;
number of times the acoustic signal representative of the voice of the subject 7 crosses the null value;
spectral model of the acoustic signal representative of the voice of the subject 7;
spectrogram of the acoustic signal representative of the voice of the subject 7.

Similarly, the "reference feature vector" is a binary code representative of the digital identity of the subject 7 and uniquely associated with the analog voice signal acquired in real time from the subject 7 and representative of the voice of the subject 7, wherein said reference feature vector has been previously acquired by the subject 7 in a profiling procedure by means of the operative server device 105 and in secure conditions, and wherein said reference feature vector has been partly stored into a memory 56-1 associated with the first authentication server device 56 and partly into a memory 106-1 associated with the second authentication server device 106: the reference feature vector has thus been previously verified and it is considered reliable.

The coding algorithm which generates the sample or reference feature vector can be implemented with a deterministic procedure or with a model obtained with machine learning techniques; the models used can be both statistical and neural, such as recurring networks, convolutional networks, autoencoding models (autoencoder). The models can have as input both audio files (as is the case for wav2vec models), and features extracted with techniques such as STFT or Mel-spectrogram.

The comparison in the electronic device 8 between the "sample feature vector" and the "reference feature vector" is then performed by calculating the similarity between the sample feature vector and the reference feature vector, wherein said similarity between the two vectors is calculated, for example, by means of the heuristic technique of cosine similarity or by means of the Euclidean distance.

Said calculation of similarity between the "sample feature vector" and the "reference feature vector" thus generates a similarity index and the following cases can occur:

the similarity index has small values if the sample feature vector and the reference feature vector belong to different persons;

the similarity index has high values if the sample feature vector and the reference feature vector belong to the same person.

It should be noted that said similarity can also be calculated after applying transformations to the feature vector.

With reference to FIGS. 6A-6D, they show a trend over time of the messages exchanged between the different components of the electronic system 201 of the third embodiment of the disclosure.

Figure 6A:
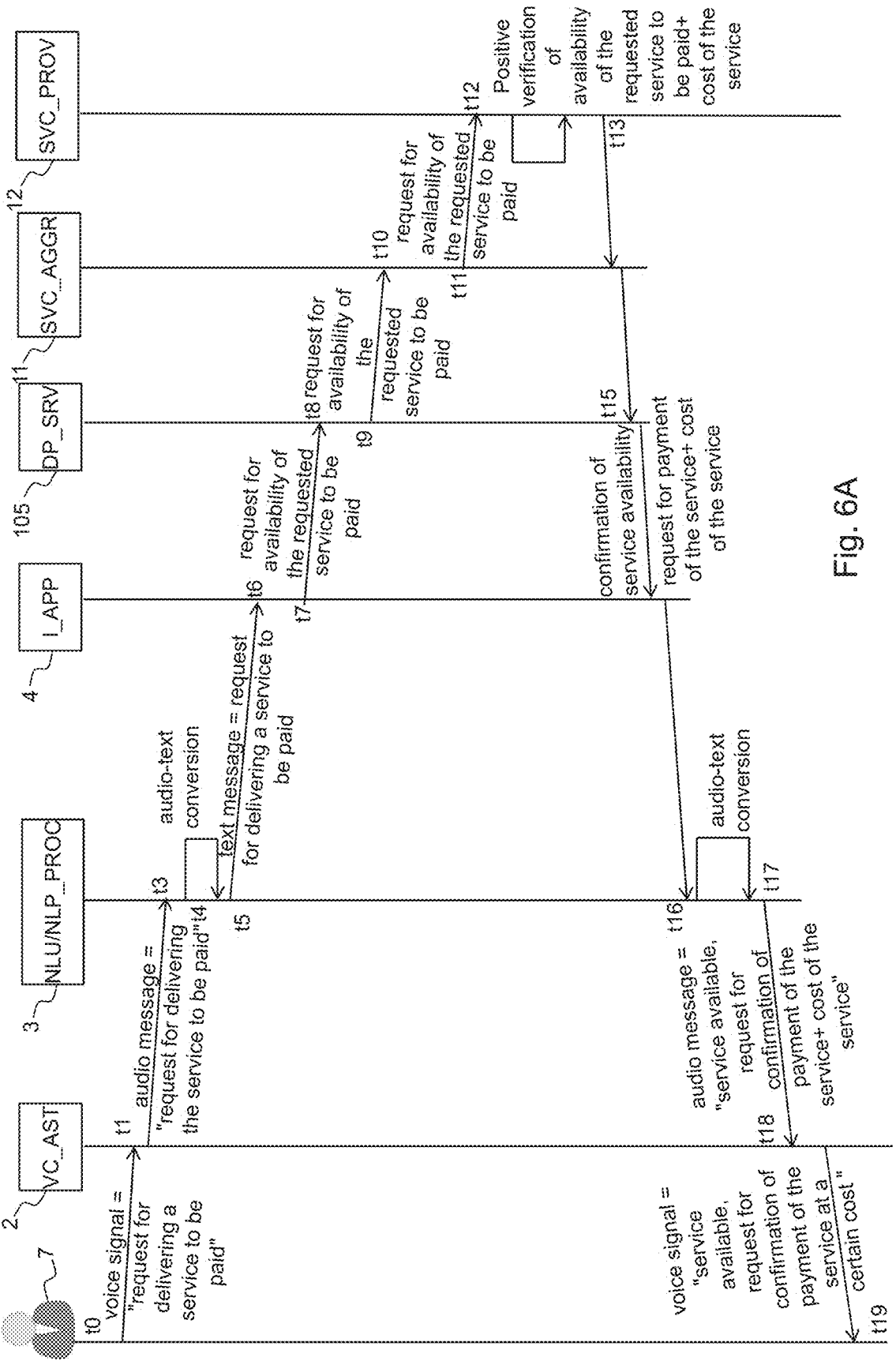
FIGS. 6A-6D show a time trend of the messages exchanged among the different components of the system according to the third embodiment of the disclosure.

The operation of the electronic system 1 of the third embodiment is the same as the operation of the electronic system 1 of the first and second embodiments up to the instant t19 of FIG. 6A, i.e., the operation shown in FIG. 2A is also applicable to the third embodiment of FIG. 6A, with the difference that in FIG. 6A there is the operative server device 105 in place of the server device 5 of FIG. 2A.

Figure 6B:
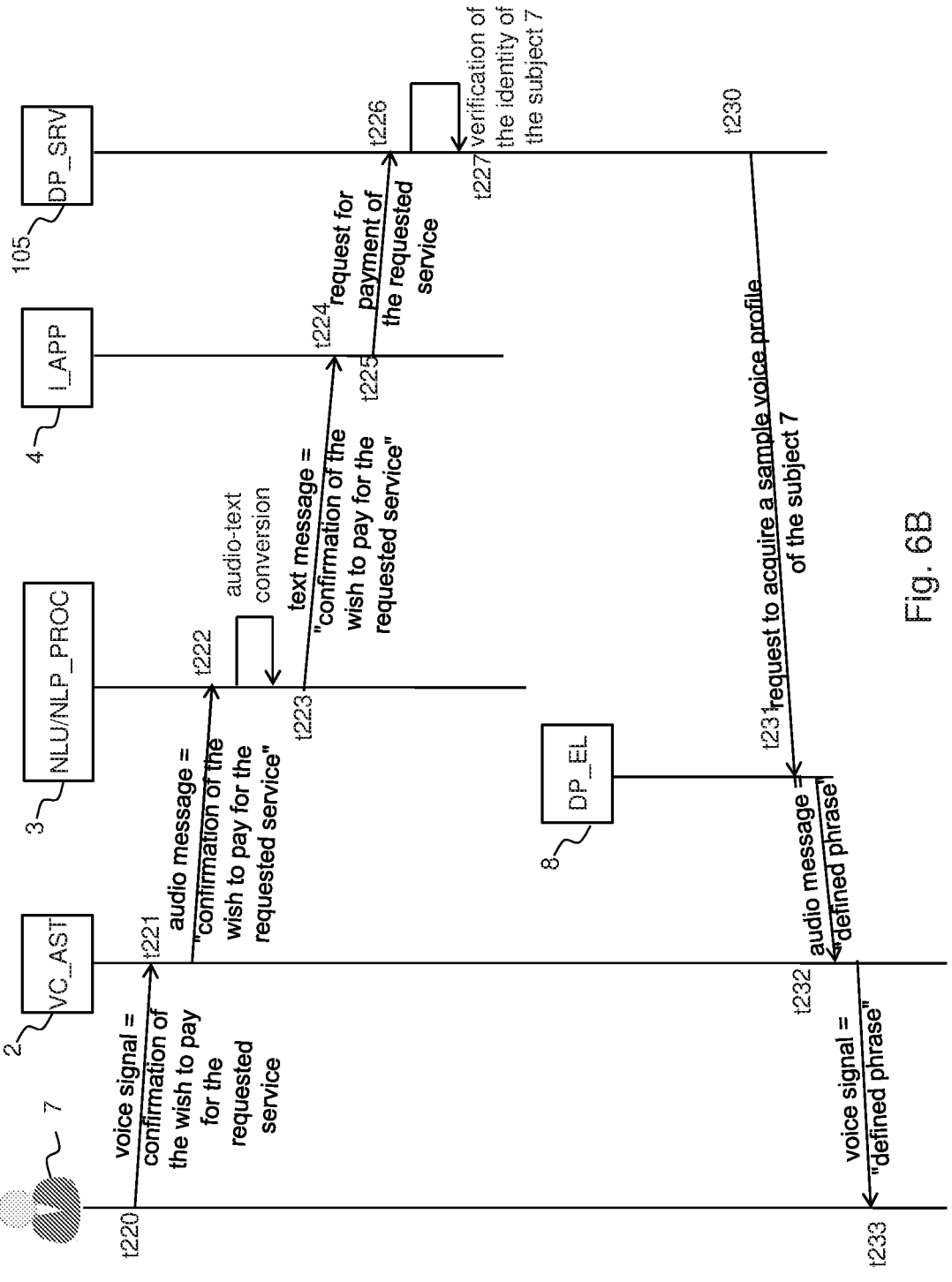
Figure 6C:
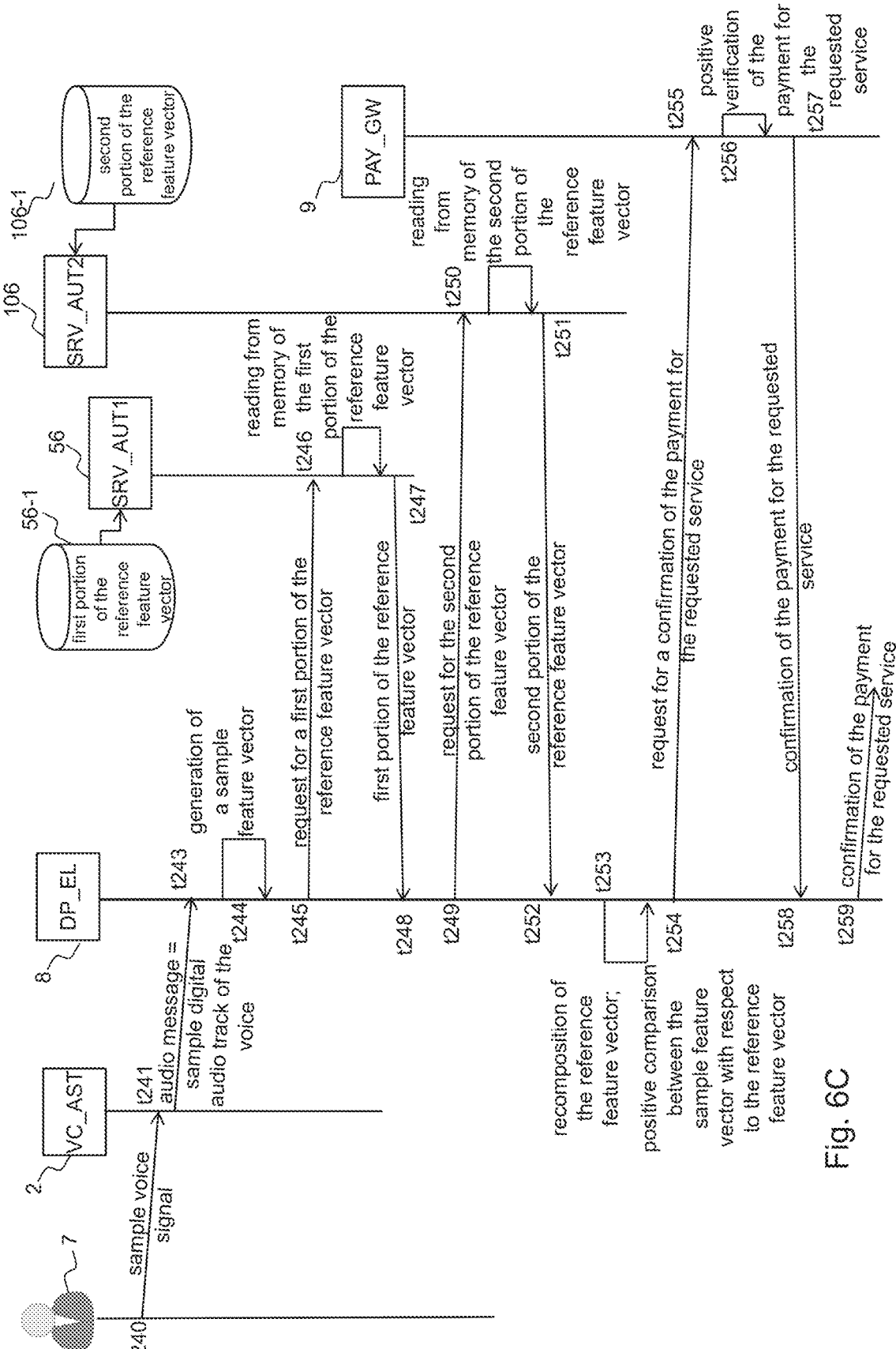
Figure 6D:
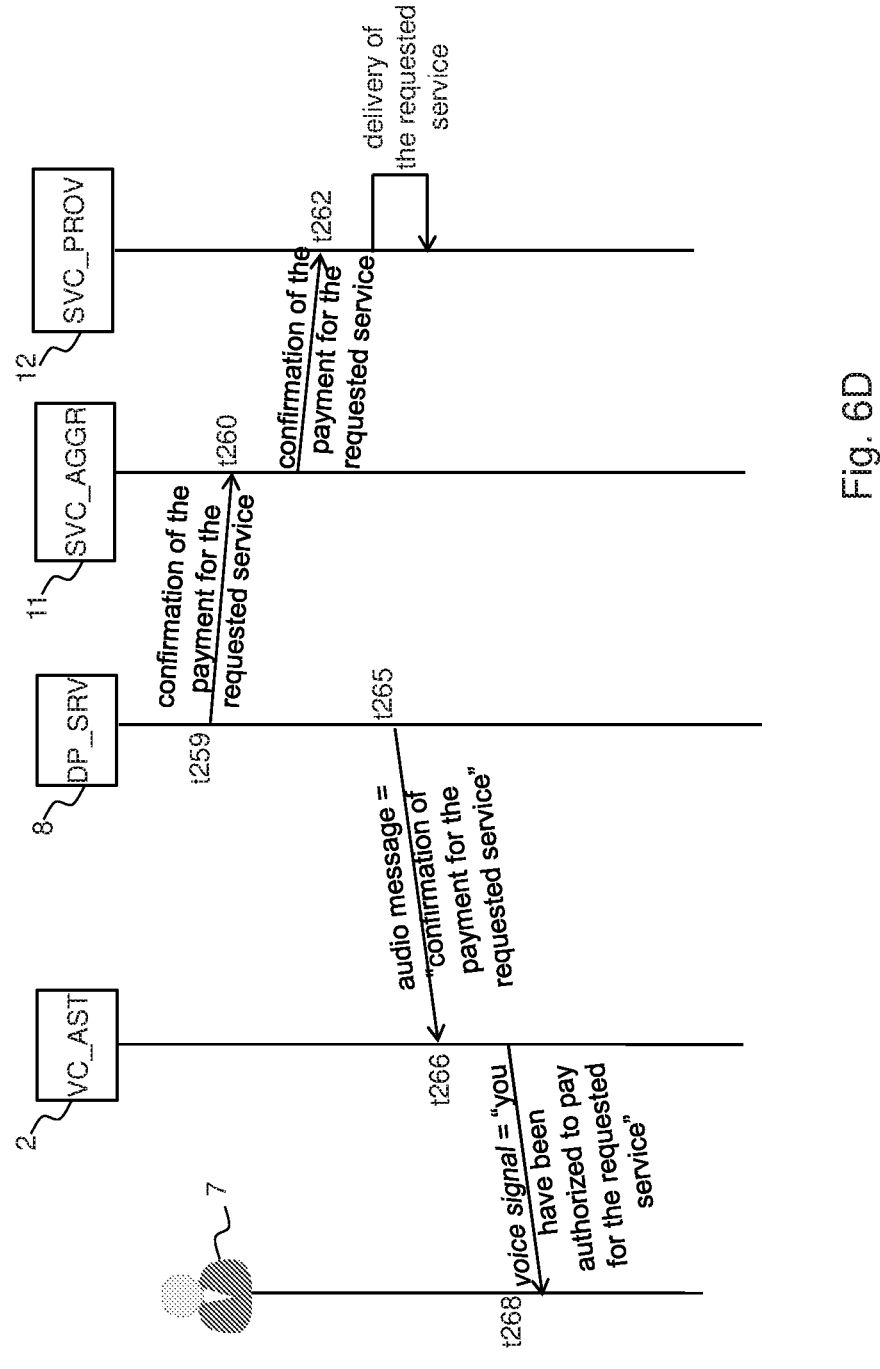

Subsequently to the instant t19, the operation of the third embodiment continues as shown in FIGS. 6B-6D and differs from the operation of the first embodiment for the following differences:

the verification of the identity of the subject 7 is performed in the operative server device 105 instead of in the profiling server device 6, i.e., the latter is functionally incorporated within the operative server device 105;

the smartphone 8 is configured to generate a "sample feature vector" as a function of an analog voice signal (i.e., an analog audio track) acquired by the subject 7 and representative of the voice of the subject 7;

in the smartphone 8 it is performed a comparison between the "sample feature vector" and a "reference feature vector" acquired in a previous profiling procedure in a secure condition.

In particular, the operation between the instant t220 (subsequent to t19) and the instant t226 is the same as that illustrated between the instants t20 and t26 for the first embodiment of FIG. 2B.

At the instant t226 (subsequent to t225) the operative server device 105 receives the text message indicative of the request for payment for the requested service (medical examination) and at the instant t227 (subsequent to t226) a procedure for verifying the identity of the subject 7 is activated in the operative server device 105, by means of the use of the voice profile, similar to that illustrated for the instant t28 for the first embodiment of the disclosure.

In particular, at the instant t230 (subsequent to t227) the operative server device 105 transmits towards the smartphone 8 an acquisition request for the sample voice profile of the subject 7, wherein said acquisition request for the sample voice profile is supposed as having been implemented by means of a voice call or a text message from the operative server device 105 to the smartphone 8 of the subject 7, using the telephone number associated with the SIM fitted in the smartphone 8 and acquired by the subject 7 in the previous profiling step.

At the instant t231 (subsequent to t230) the electronic device 8 receives the message of the acquisition request for the sample voice profile of the subject 7, in particular by means of a voice call or a text message, then the smartphone 8 transmits to the voice assistant 2 an audio message indicative of a request to say a defined phrase.

At the instant t232 the voice assistant 2 receives the audio message indicative of the request to say the defined phrase, then generates (by means of the speaker of the smartphone 8) towards the subject 7 a voice message (i.e., a sound) indicative of the request to say the defined phrase.

At the instant t233 the subject 7 receives said voice message indicative of the request to say the defined phrase and at the instant t240 the subject 7 emits with the voice a sound saying the requested phrase, which will be used to generate the sample vector feature associated with the subject 7.

At the instant t240 (subsequent to t233) the subject 7 emits with the voice a sound by saying a defined phrase or by reading aloud the value of an alphanumeric code received, then at the instant t241 the voice assistant 2 acquires (by means of the microphone of the smartphone 8) the voice signal representative of the defined phrase (or the value of the alphanumeric code) said by the subject 7, then an analog to digital conversion of the acquired voice signal is performed and a sample digital audio track representative of the voice of the subject 7 is generated therefrom, then said sample digital audio track is forwarded by the voice assistant 2 to the smartphone 8.

At the instant t243 the smartphone 8 receives the sample digital audio track representative of the voice and at the instant t244 the processing unit of the smartphone 8 generates in real time a sample vector feature as a function of the sample digital audio track representative of the voice of the subject 7.

At the instant t245 (subsequent to t244) the smartphone transmits towards the first authentication server device 56 a message indicative of a request for a first portion of a reference feature vector of the subject 7.

At the instant t246 (subsequent to t245) the first authentication server device 56 receives the message indicative of the request for the first portion of the reference feature vector, reads from the memory 56-1 thereof the first portion of the reference feature vector and at the instant t247 (subsequent to t246) transmits towards the smartphone 8 a message carrying the first portion of the reference feature vector.

At the instant t248 (subsequent to t247) the smartphone 8 receives a message carrying the first portion of the reference feature vector and temporarily stores it in an internal memory or a memory associated therewith.

Similarly, at the instant t249 (subsequent to t248) the smartphone 8 transmits towards the second authentication server device 106 a message indicative of a request for a second portion of a reference feature vector of the subject 7.

At the instant t250 (subsequent to t249) the second authentication server device 106 receives the message indicative of the request for the second portion of the reference feature vector, reads from the memory 106-1 thereof the second portion of the reference feature vector and at the instant t251 (subsequent to t250) transmits towards the smartphone 8 a message carrying the second portion of the reference feature vector.

At the instant t252 (subsequent to t251), the smartphone 8 receives a message carrying the second portion of the reference feature vector and temporarily stores it in an internal memory or a memory associated therewith.

The above considerations regarding the timing of the messages exchanged between t145 and t153 of the second embodiment of FIG. 4A are similarly applicable to the messages exchanged between t245 and t252 of the third embodiment of FIG. 6A.

At the instant t253 (subsequent to t252) the smartphone 8 decodes the first and second portion of the reference feature vector and recomposes the first and second portion of the reference feature vector, regenerating the reference feature vector therefrom.

Subsequently, the smartphone 8 compares the similarity between the sample feature vector and the reference feature vector, in order to verify whether they belong to the same person, i.e., the subject 7; in particular, a similarity index is calculated and this is compared with a similarity threshold value.

It is assumed that the comparison is positive, i.e., that the smartphone 8 detects (by means of the processing unit thereof) that the value of the calculated similarity index is greater than the similarity threshold value: in this case, at the instant t254 the smartphone 8 transmits towards the payment server device 9 a message indicative of a request for confirmation of the payment for the requested service.

At the instant t255 (subsequent to t254) the payment server device 9 receives the message indicative of the request for confirmation of payment for the requested service and at the instant t256 the payment server device 9 verifies whether the subject 7 is authorized to make the payment for the requested service.

It is assumed that said verification performed on the payment server device 9 is positive, i.e., that the payment server device 9 has verified that the subject 7 is authorized to make the payment for the requested service with the payment system associated with the payment server device 9: therefore, at the instant t257 the payment server device 9 transmits towards the smartphone 8 a message indicative of a confirmation of the payment for the requested service.

At the instant t258 the smartphone 8 receives the message indicative of the confirmation of the payment for the requested service, then at the instant t259 the smartphone 8 transmits towards the service aggregator 11 a message indicative of the confirmation of the payment for the requested service, then said message is forwarded to the external service provider 12, wherein the requested service is actually delivered at the instant t166.

The operation between the instants t260 and t268 is the same as that illustrated above between the instants t70 and t77 for the first embodiment.

It should be noted that for simplicity's sake in the third embodiment the case has been considered in which the reference voice profile has been divided into two portions stored in respective network server devices 56, 106, but more generally the reference voice profile can be divided into two or more distinct portions stored into two or more corresponding network server devices.

In one embodiment, according to a variant of the second or third embodiment, a public-private key digital signature (asymmetric encryption) is used to verify the authenticity and integrity of the messages transmitted by the subject 7 requesting the good or service, i.e., to verify that the sender of the message is really who he/she claims to be (i.e., the subject 7) and that the message has not been altered along the path from the sender to the recipient.

The public and private keys are generated in advance under secure conditions, wherein the public key is stored into a respective memory associated with the first authentication server device 56 and the second authentication server 106, while the private key is stored only into the operative server device 105 and is known only thereto.

Furthermore, a configuration parameter indicative of a defined hash algorithm (e.g., SHA256) is stored in a respective memory associated with the operative server device 105, the first authentication server device 56 and the second authentication server 106.

Furthermore, a user identifier uniquely associated with the subject 7 is stored in the smartphone 8, wherein said user identifier represents a unique signed key used to sign and encrypt the messages exchanged between the smartphone 8 and the first authentication server device 56 and the messages exchanged between the smartphone 8 and the second authentication server device 106.

In this case, the operation of the variant of the second embodiment is modified as follows:

at the instant t143, the smartphone 8 transmits towards the operative server device 105 an audio message carrying the digital audio track representative of the voice of the subject 7, together with the user identifier;

at the instant t145, the operative server device 105 receives the audio message carrying the sample digital audio track and the user identifier associated with the subject 7, then the operative server device 105 generates (by means of the processing unit thereof) a digital fingerprint (message digest) of the user identifier based on a defined hash algorithm, thereby generating a string of alphanumeric characters (i.e., an alphanumeric code), then an encryption of the generated alphanumeric code is performed using a private key so as to generate a new alphanumeric code representing the digital signature of the user identifier, and finally the operative server device 105 transmits towards the first authentication server device 56 the message indicative of a request for a first portion of the reference voice profile of the subject 7, together with the user identifier and the digital signature of the user identifier;

at the instant t147 the first authentication server device 56 receives the message indicative of the request for the first portion of the reference voice profile, wherein said message carries the user identifier together with the digital signature thereof, then the first authentication server device 56 reads from its memory 56-1 a public key, then the first authentication server device 56 performs (by means of the processing unit thereof) the decryption of the received digital signature of the user identifier by means of the public key thus decoding the fingerprint of the user identifier, then a fingerprint of the received user identifier is calculated with the same hash algorithm used in transmission, then a comparison is performed between the received fingerprint of the user identifier and the calculated fingerprint of the user identifier and it is assumed that they are exactly the same, thus the authenticity and integrity of the message transmitted by the operative server device 105 to the first authentication server device 56 has been verified;

similarly to the instant t150, the same operations as the previous instant t145 are performed (i.e., generation of the digital signature of the user identifier), with the difference that the message is transmitted to the second authentication server device 106;

similarly to the instant t151, the same operations as the previous instant t147 are performed (i.e., receiving the digital signature of the user identifier and positively verifying the authenticity and integrity of the message transmitted by the operative server device 105 to the second authentication server device 106), with the difference that the second portion of the reference voice profile is read from the memory instead of the first portion.

Similarly, the operation of the variant of the third embodiment is modified as follows:

at the instant t243, the smartphone 8 receives the audio message carrying the sample digital audio track representative of the voice of the subject 7, then the smartphone 8 generates (by means of the processing unit thereof) a digital fingerprint (message digest) of the user identifier based on a defined hash algorithm, thereby generating a string of alphanumeric characters (i.e., an alphanumeric code), then an encryption of the alphanumeric code generated is performed using a private key so as to generate a new alphanumeric code representing the digital signature of the user identifier, and finally the smartphone 8 transmits towards the first authentication server device 56 the message indicative of a request for a first portion of the reference voice profile of the subject 7, together with the user identifier and the digital signature of the user identifier;

the operation at the instant t246 is the same as that illustrated at the instant t147 for the variant of the second embodiment;

the operation at the instant t247 is the same as that illustrated at the instant t148 for the variant of the second embodiment, with the difference that the first portion of the reference feature vector is transmitted from the first authentication server device 56 to the smartphone 8 instead of to the operative server device 105;

the operation at the instant t250 is the same as that illustrated at the instant t151 for the variant of the second embodiment;

the operation at the instant t251 is the same as that illustrated at the instant t152 for the variant of the second embodiment, with the difference that the second portion of the reference feature vector is transmitted from the second authentication server device 106 to the smartphone 8 instead of to the operative server device 105.

In one embodiment of the second embodiment (or in the variant thereof), one or more images representative of the face of the subject 7 are further acquired, in addition to the voice signal representative of the voice of the subject 7, both in the profiling procedure and in real time, thus generating a reference voice/face profile and a sample voice/face profile.

In one embodiment of the third embodiment (or in the variant thereof), one or more images representative of the face of the subject 7 are further acquired, in addition to generating the feature vector of the subject 7, both in the profiling procedure and in real time, thus generating a reference feature vector and a reference face profile and generating a sample feature vector and a sample face profile.

For example, in the profiling procedure a video recording is acquired in which at least the face of the subject 7 is framed and in which he/she says a defined phrase aloud, thus generating the reference face profile together with the reference feature vector; similarly, a video recording is acquired in real time in which at least the face of the subject 7 is framed and in which he/she says a defined phrase aloud, thus generating the sample face profile together with the sample feature vector.

One embodiment of the present disclosure is a method for enabling payment of a good or service by means of voice commands.

The method is implemented in part by means of a suitable software program running on an electronic processor (for example, a microprocessor or an IOT device or an Arduino) of the voice assistant 2 or which implements the voice assistant 2, in part by means of a suitable software program running on an electronic processor (for example, a microprocessor) of the electronic device 8, in part by means of a software program which implements the application for delivering services to be paid 4, in part by means of a suitable software program running on an electronic processor (for example, a microprocessor) of the profile decoding and payment enabling server device 5, in part by means of a suitable software program running on an electronic processor (for example, a microprocessor) of the profiling server device 6 and in part by means of a suitable software program running on an electronic processor (for example, a microprocessor) of the payment server device 9.

The method for enabling payment comprises, alternatively, the same steps indicated:

in the description of FIGS. 2A-D related to the operation of the electronic system 1 of the first embodiment;

in the description of FIGS. 4A-B related to the operation of the electronic system 101 of the second embodiment and the variant thereof;

in the description of FIGS. 6A-D related to the operation of the electronic system 201 of the third embodiment and the variant thereof.

One embodiment of the present disclosure is a computer program comprising software code portions running on a computer which performs the application for delivering services to be paid 4.

One embodiment of the present disclosure is a non-transitory computer-readable storage medium having a program comprising software code portions running on a computer which performs the application for delivering services to be paid 4.

The software program of the application for delivering services to be paid 4 performs some steps of the method for enabling payment for a good or service illustrated above of the first, second or third embodiment or of the variants of the second or third embodiment.

One embodiment of the present disclosure is a computer program comprising software code portions running on an electronic processor of the profile decoding and payment enabling server device 5 of the first embodiment, or running on a computer of the operative server device 105 of the second embodiment.

One embodiment of the present disclosure is a non-transitory computer-readable storage medium having a program comprising software code portions running on a computer of the profile decoding and payment enabling server device 5 of the first embodiment, or running on a computer of the operative server device 105 of the second embodiment.

The software program of the server device 5 or the operative server device 105 performs some steps of the method for enabling payment of a good or service illustrated above respectively for the first or second embodiment.

One embodiment of the present disclosure is a computer program comprising software code portions running on a computer of the profiling server device 6.

One embodiment of the present disclosure is a non-transitory computer-readable storage medium having a program comprising software code portions running on a computer of the profiling server device 6.

The software program of the profiling server device 6 performs some steps of the method for enabling payment of a good or service illustrated above.

One embodiment of the present disclosure is a computer program comprising software code portions running on a computer of the payment server device 9.

One embodiment of the present disclosure is a non-transitory computer-readable storage medium having a program comprising software code portions running on a computer of the payment server device 9.

The software program of the payment server device 9 performs some steps of the method for enabling payment of a good or service illustrated above.

One embodiment of the present disclosure is a computer program comprising software code portions running on a computer of the electronic device 8.

One embodiment of the present disclosure is a non-transitory computer-readable storage medium having a program comprising software code portions running on a computer of the electronic device 8.

The software program of the electronic device 8 performs some steps of the method for enabling payment of a good or service illustrated above for the third embodiment or for the related variant.

It should be noted that the disclosure in the three embodiments and related variants indicated above is applicable not only to enable the payment for a good or service by means of voice commands, but more generally can be used to control an electro-mechanical actuator by means of voice commands, for example to control the opening of an access door, the opening of an automatic gate, the ignition of a motor vehicle. In this case, the disclosure differs from the three embodiments illustrated above in that:

there is no application for delivering services to be paid 4;

the server device 5 or 105 is replaced by a profile decoding and control enabling server device;

the payment server device 9 is replaced by an electro-mechanical actuator.

In particular, the subject 7 says aloud an actuation command to be executed by means of the electro-mechanical actuator (for example, the opening of an automatic gate), then this command is processed by means of the human language electronic processor 3, which is capable of performing a sound-to-text conversion of the actuation command and then the actuation command is extracted, which is used to command the electro-mechanical actuator (in the example, the opening of the automatic gate).

According to the first embodiment of the disclosure, it is also provided a further method implemented by at least one computer to enable the control of an electro-mechanical actuator by means of voice commands.

The control method of the actuator comprises:

a) receiving, at a voice assistant 2, a voice message indicative of a request to control the actuator and transmitting, towards an electronic human language processor 3, a first audio message indicative of the request to control the actuator;

b) receiving, at the human language processor 3, said audio message indicative of the request to control the actuator and transmitting, towards a profile decoding and control enabling server device, a second message indicative of an availability request of the actuator;

c) receiving, at the profile decoding and control enabling server device 5, a third message indicative of a confirmation of availability of the requested actuator and forwarding the third message to the human language electronic processor 3;

d) receiving, at the human language processor 3, the third message and transmitting, towards the voice assistant 2, an audio message indicative of the availability of the actuator;

e) receiving, at the voice assistant 2, said audio message and generating a voice message indicative of an availability of the actuator;

f) receiving, at the voice assistant 2, a voice message indicative of a confirmation of the wish to control the actuator and transmitting, towards the electronic human language processor 3, an audio message indicative of the confirmation of the wish to control the actuator;

g) receiving, at the human language processor 3, said audio message and transmitting, towards the profile decoding and control enabling server device 5, a fourth message indicative of the confirmation of the will to control the actuator;

h) receiving, at the profile decoding and control enabling server device 5, the fourth message and transmitting, towards a profiling server device 6, a fifth message indicative of a request to enable the control of the actuator;

i) receiving, at the profiling server device 6, the fifth message and transmitting, towards an electronic device 8, a request to acquire a sample voice profile of a subject with which the electronic device 8 is associated;

j) receiving, at the electronic device 8, said request to acquire the sample voice profile and forwarding it to the voice assistant 2;

k) receiving, at the voice assistant 2, an audio message indicative of a request to say a phrase and generate a voice message indicative of the request to say the phrase;

l) acquiring, at the voice assistant 2, a sound representative of the requested phrase and generating therefrom a digital audio track representative of the requested phrase;

m) forwarding the sample digital audio track to the electronic device 8 and transmitting, from the electronic device 8 towards the profiling server device 6, an audio message representative of the sample digital audio track;

n) receiving, at the profiling server device 6, the message representative of the sample digital audio track and transmitting, towards an electro-mechanical actuator, a sixth message indicative of a request for a second portion of a reference voice profile of the subject 7;

o) receiving, at the electro-mechanical actuator, the sixth message, reading the second portion from a memory 9-1 associated with the actuator and transmitting, towards the profiling server device 6, a seventh message carrying the second portion of the reference voice profile;

p) receiving, at the profiling server device 6, the seventh message, reading a first portion of the reference voice profile from a memory 6-1 associated with the profiling server device 6 and transmitting, towards the profile decoding and control enabling server device 5, an eighth message carrying the sample digital audio track and carrying the first and the second portion of the reference voice profile;

q) receiving, at the profile decoding and control enabling server device 5, the eighth message, generating a sample voice profile as a function of the sample digital audio track and recomposing the first and second portion so as to regenerate the reference voice profile;

r) comparing, at the profile decoding and control enabling server device 5, the sample voice profile with respect to the reference voice profile and detecting that they are compatible with each other;

s) transmitting, from the profile decoding and control enabling server device 5 to the profiling server device 6, a ninth message indicative of a confirmation of the identity of the subject and indicative of a request for confirmation of the control of the actuator;

t) receiving, at the profiling server device 6, the ninth message and forwarding it to the actuator;

u) receiving, at the actuator, the ninth message and verifying if the subject is authorized to control the actuator;

v) detecting, at the actuator, that the subject is authorized to control and transmitting towards the profiling server device 6 a tenth message indicative of a confirmation of the control of the actuator;

z) receiving, at the profiling server device 6, the tenth message and forwarding it to the profile decoding and control enabling server device 5;

a1) receiving, at the profile decoding and control enabling server device 5, the tenth message and transmitting, towards the electronic human language processor 3, an eleventh message indicative of a confirmation of the control of the actuator;

b1) forwarding the eleventh message to the voice assistant 2;

c1) receiving, at the voice assistant 2, an audio message indicative of the confirmation of the control of the actuator and generating a voice message indicative of the confirmation of the control of the actuator.

According to the first embodiment of the disclosure, it is also provided a further electronic system for enabling the control of an electro-mechanical actuator by means of voice commands.

The control system comprises a voice assistant 2, a human language electronic processor 3 connected to the voice assistant 2, a profile decoding and control enabling server device 5 connected to the human language electronic processor 3, a profiling server device 6 connected to the profile decoding and control enabling server device, an electro-mechanical actuator connected to the profiling server device 6 and an electronic device 8, wherein the voice assistant 2 is configured to:

receive a voice message indicative of a request to control the actuator and transmit, towards an electronic human language processor 3, an audio message indicative of the request to control the actuator;

receive an audio message indicative of an availability of the actuator and generate a voice message indicative of the availability of the actuator and indicative of a request for confirmation of the will to control the actuator;

receive a voice message indicative of a confirmation of the wish to control the actuator and transmitting, towards the electronic human language processor 3, an audio message indicative of the confirmation of the wish to control the actuator;

receive an audio message indicative of a request to say a phrase and generate a voice message indicative of the request to say the phrase;

acquire a sound representative of the requested phrase and generating therefrom a digital audio track representative of the requested phrase;

forward the sample digital audio track to the electronic device (8);

receive an audio message indicative of a confirmation of the control of the actuator and generate a voice message indicative of the confirmation of the control of the actuator;

wherein the electronic human language processor (3) is configured to:

receive the audio message indicative of the request to control the actuator and transmit, to the profile decoding and control enabling server device, a first message indicative of the request to control the actuator;

receive a third message indicative of a confirmation of availability of the control of the actuator and transmit, towards the voice assistant (2), an audio message indicative of the availability of the control of the actuator;

receive the audio message indicative of the confirmation of the wish to control the actuator and transmit, to the profile decoding and control enabling server device (5), a text message indicative of the confirmation of the will to control the actuator;

receive an eleventh message indicative of the confirmation of the control of the actuator and forward it to the voice assistant (2);

wherein the profile decoding and control enabling server device (5) is configured to:

receive a second message indicative of the request to control the actuator;

receive the third message and forward it to the electronic human language processor (3);

receive a fourth message indicative of a request to control the actuator and transmit, to the profiling server device (6), a fifth message indicative of a request for enabling the control of the actuator;

receive an eighth message carrying the sample digital audio track received and carrying a first and a second portion of the reference voice profile, generate a sample voice profile as a function of the sample digital audio track and recompose the first and second portion so as to regenerate a reference voice profile;

compare the sample voice profile with respect to the reference voice profile and detect that they are compatible with each other;

transmit, towards the profiling server device (6), a ninth message indicative of a confirmation of the identity of the subject and indicative of a request to confirm the control of the actuator;

receive, at the profile decoding and control enabling server device (5), a tenth message indicative of a confirmation of the control of the actuator and transmit, towards the electronic human language processor (3), the eleventh message;

and wherein the profiling server device (6) is configured to:

receive the fifth message and transmit, towards an electronic device (8), a request to acquire a sample voice profile of a subject with which the electronic device (8) is associated;

receive the sample digital audio track and transmit, towards the actuator, a sixth message indicative of a request for a second portion of a reference voice profile of the subject (7);

receive a seventh message carrying the second portion of the reference voice profile, read a first portion of the reference voice profile from a memory (6-1) associated with the profiling server device (6) and transmit, towards the profile decoding and control enabling server device (5), an eighth message carrying the received sample voice profile and carrying the first and the second portion of the reference voice profile;

receive the ninth message and forward it to the actuator;

receive, at the profiling server device (6), the tenth message and forward it to the profile decoding and payment enabling server device (5);

and wherein the actuator (9) is configured to:

receive the sixth message, read the second portion from a memory (9-1) associated with the actuator (9) and transmit, towards the profiling server device (6), a seventh message carrying the second portion of the reference voice profile;

receive the ninth message and verify if the subject is authorized to control the actuator;

detect that the subject is authorized to control the actuator and transmit towards the profiling server device (6) the tenth message;

and wherein the electronic device (8) is configured to:

receive said request to acquire the sample voice profile and forward it to the voice assistant (2);

receive the sample digital audio track and transmit, toward the profiling server device (6), an audio message representative of the sample digital audio track.

The invention claimed is:

1. A method implemented by at least one computer for providing security when enabling payment of a good or service by means of voice commands, the method comprising the steps of:

a) receiving, at a voice assistant, a voice message indicative of a request for delivering a good or service to be paid and transmitting, towards an electronic human language processor an audio message indicative of the request for delivering the good or service to be paid;

b) receiving, at the electronic human language processor, said voice message indicative of the request for delivering the good or service to be paid and transmitting, towards an application for delivering services to be paid, a first message indicative of the request for delivering the good or service to be paid;

c) receiving, at the application for delivering services to be paid, the first message and transmitting, towards an operative server device, a second message indicative of a request for availability of the requested service to be paid;

d) receiving, at the operative server device, a third message indicative of a confirmation of availability of the requested good or service to be paid and indicative of a request for payment of the cost of the requested good or service and forwarding the third message through the application for delivering services to be paid and the electronic human language processor;

e) receiving, at the electronic human language processor, the third message and transmitting, towards the voice assistant, an audio message indicative of the availability of the requested good or service to be paid and indicative of the request for payment of the cost of the requested good or service;

f) receiving, at the voice assistant, said audio message and generating a voice message indicative of an availability of the requested good or service to be paid and indicative of the request for payment of the cost of the requested good or service;

g) receiving, at the voice assistant, a voice message indicative of a confirmation of the wish to pay for the requested good or service and transmitting, towards the electronic human language processor, an audio message indicative of the confirmation of the wish to pay for the requested good or service;

h) receiving, at the electronic human language processor, said audio message and transmitting, towards the application for delivering services to be paid, a text message indicative of the confirmation of the wish to pay for the requested good or service;

i) receiving, at the application for delivering services to be paid, the text message and transmitting, towards the operative server device, a fourth message indicative of a request to pay for the requested good or service;

j) receiving, as part of a security operation, at the operative server device, the fourth message and transmitting, towards an electronic device, a request to acquire a sample voice profile of a subject with which the electronic device is associated;

k) receiving, at the electronic device, said request to acquire the sample voice profile and forwarding it the sample voice profile to the voice assistant during the security operation;

l) receiving, at the voice assistant, an audio message indicative of a request to say a phrase and generate a voice message indicative of the request to say the phrase during the security operation;

m) acquiring, at the voice assistant, a sound representative of the requested phrase and generating therefrom a sample digital audio track representative of the voice of the subject during the security operation;

n) forwarding the sample digital audio track to the electronic device and transmitting, from the electronic device towards the operative server device, an audio message carrying the sample digital audio track representative of the voice of the subject during the security operation;

o) receiving, at the operative server device, the audio message representative of the sample digital audio track of the voice of the subject and transmitting, towards a first authentication server device, a sixth message indicative of a request for a first portion of a reference voice profile of the subject during the security operation;

p) receiving, at the first authentication server device, the sixth message, reading the first portion from a memory associated with the first authentication server device and transmitting, towards the operative server device, a seventh message carrying the first portion of the reference voice profile during the security operation;

q) receiving, at the operative server device, the seventh message and transmitting, towards the second authentication server device, an eighth message indicative of a request for a second portion of the reference voice profile of the subject during the security operation;

r) receiving, at the second authentication server device, the eighth message, reading a second portion of the reference voice profile from a memory associated with the second authentication server device and transmitting, towards the operative server device, a ninth message carrying the second portion of the reference voice profile during the security operation;

s) receiving, at the operative server device, the ninth message, generating a sample voice profile as a function of the sample audio track of the voice of the subject and recomposing the first and second portion so as to regenerate the reference voice profile during the security operation;

t) comparing, at the operative server device, the sample voice profile with respect to the reference voice profile and detecting that they are compatible with each other during the security operation;

u) transmitting, from the operative server device to the payment server device, a tenth message indicative of a confirmation of the identity of the subject and indicative of a request for confirmation of the payment for the requested good or service during the security operation;

a1) receiving, at the payment server device, the tenth message and checking if the subject is authorized to make the payment for the requested good or service;

b1) detecting, at the payment server device, that the subject is authorized to make the payment for the requested good or service and transmitting, towards the operative server device, an eleventh message indicative of a confirmation of payment for the requested good or service;

c1) receiving, at the operative server device, the eleventh message and transmitting, towards the application for delivering services to be paid, a twelfth message indicative of a confirmation of the payment for the requested good or service;

d1) forwarding the twelfth message through the application for delivering services to be paid, the electronic human language processor and the voice assistant;

e1) receiving, at the voice assistant, an audio message indicative of the confirmation of the payment for the requested good or service and generating a voice message indicative of the confirmation of the payment for the requested good or service.

2. The method according to claim 1, further comprising between steps c) and d), the steps of:

transmitting, from the operative server device towards a service aggregator, the second message indicative of the request for availability of the requested service to be paid;

receiving, at the service aggregator, the second message and forwarding it to an external service provider;

receiving, at the external service provider, the second message and checking if the requested good or service to be paid is available;

detecting the availability of the requested good or service to be paid and transmitting, towards the service aggregator, the third message indicative of the confirmation of availability of the requested good or service to be paid and indicative of a request for payment of the cost of the requested good or service;

receiving, at the service aggregator, the third message and forwarding it to the operative server device.

3. The method according to claim 2, during the security operation:

wherein in step j) said transmission of the request to acquire the sample voice profile comprises, alternatively:

performing, between the profiling server device and the electronic device, a voice call carrying said request to acquire the sample voice profile;

a text message indicative of said request to acquire the sample voice profile;

a text message carrying an alphanumeric code;

an audio message indicative of said request to acquire the sample voice profile;

an email message indicative of said request to acquire the sample voice profile;

wherein the step l) comprises generating, by means of the voice assistant, a voice message indicative of a request to say a defined phrase or indicative of a request to say the alphanumeric code, wherein the step m) comprises acquiring, from the voice assistant, a sound representative of the defined phrase requested or representative of the alphanumeric code.

4. The method according to claim 1, wherein, during the security operation:

in the step j) said request comprises a request to acquire a sample voice/face profile of the subject;

the step k) comprises receiving, at the electronic device, said request to acquire the sample voice/face profile and forwarding it sample voice/face profile to the voice assistant during the security operation;

the step l) further comprises a request to acquire an image of at least one part of the face of the subject;

the step m) further comprises acquiring the image of at least part of the face of the subject by a camera of the electronic device;

the step n) further comprises forwarding to the electronic device the image representative of at least part of the face of the subject and comprises transmitting, from the electronic device towards the operative server device, an audio-video message representative of the sample digital audio track of the voice of the subject and of at least part of the face of the subject;

the step o) comprises receiving, at the operative server device, the audio-video message and transmitting, towards the authentication server device, the sixth message indicative of the request for the first portion of a reference voice/face profile of the subject;

the step p) comprises receiving, at the first authentication server device, the sixth message, reading the first portion from the memory associated with the first authentication server device and transmitting, towards the operative server device, a seventh message carrying the first portion of the reference voice/face profile;

the step q) comprises receiving the seventh message and transmitting the eighth message indicative of a request for a second portion of the reference voice/face profile of the subject;

the step r) comprises receiving the eighth message, reading a second portion of the reference voice/face profile from the memory associated with the second authentication server device and transmitting the ninth message carrying the second portion of the reference voice/face profile;

the step s) comprises receiving the ninth message, generating a sample voice/face profile as a function of the sample audio track and of the image of at least part of the face of the subject and recomposing the first and second portion so as to regenerate the reference voice/face profile;

the step t) comprises comparing, at the operative server device, the sample voice/face profile with respect to the reference voice profile and detecting that they are compatible with each other.

5. The method according to claim 4, wherein in step j) said transmission of the request to acquire the sample voice/face profile comprises during the security operation, alternatively:

performing, between the operative server device and the electronic device, a voice call carrying said request to acquire the sample voice/face profile;

a text message indicative of said request to acquire the sample voice/face profile;

an audio message indicative of said request to acquire the sample voice/face profile;

an email message indicative of said request to acquire the sample voice/face profile;

wherein the step l) comprises generating, by means of the voice assistant, a voice message indicative of a request to say a defined phrase and indicative of a request to take a photo of the face of the subject, wherein the step n) comprises acquiring, by means of a camera of the electronic device, an image representative of at least part of the face of the subject and comprises transmitting, from the electronic device towards the profiling server device, an audio-video message carrying the sample digital audio track of the subject and carrying the image representative of at least part of the face of the subject;

and wherein the step s) comprises generating the sample voice/face profile of the subject, as a function of the sample audio track of the voice of the subject and as a function of the image representative of at least part of the face of the subject.

6. The method according to claim 2, wherein, during the security operation:

in the step j) said request comprises a request to acquire a sample voice/face profile of the subject;

the step k) comprises receiving, at the electronic device, said request to acquire the sample voice/face profile and forwarding it to the voice assistant;

the step l) further comprises a request to acquire an image of at least one part of the face of the subject;

the step m) further comprises acquiring the image of at least part of the face of the subject by a camera of the electronic device;

the step n) further comprises forwarding to the electronic device the image representative of at least part of the face of the subject and comprises transmitting, from the electronic device towards the operative server device, an audio-video message representative of the sample digital audio track of the voice of the subject and of at least part of the face of the subject;

the step o) comprises receiving, at the operative server device, the audio-video message and transmitting, towards the authentication server device, the sixth message indicative of the request for the first portion of a reference voice/face profile of the subject;

the step p) comprises receiving, at the first authentication server device, the sixth message, reading the first portion from the memory associated with the first authentication server device and transmitting, towards the operative server device, a seventh message carrying the first portion of the reference voice/face profile;

the step q) comprises receiving the seventh message and transmitting the eighth message indicative of a request for a second portion of the reference voice/face profile of the subject;

the step r) comprises receiving the eighth message, reading a second portion of the reference voice/face profile from the memory associated with the second authentication server device and transmitting the ninth message carrying the second portion of the reference voice/face profile;

the step s) comprises receiving the ninth message, generating a sample voice/face profile as a function of the sample audio track and of the image of at least part of the face of the subject and recomposing the first and second portion so as to regenerate the reference voice/face profile;

the step t) comprises comparing, at the operative server device, the sample voice/face profile with respect to the reference voice profile and detecting that they are compatible with each other.

7. The method according to claim 6, during the security operation:

wherein in step j) said transmission of the request to acquire the sample voice profile comprises, alternatively:

performing, between the profiling server device and the electronic device, a voice call carrying said request to acquire the sample voice profile;

a text message indicative of said request to acquire the sample voice profile;

a text message carrying an alphanumeric code;

an audio message indicative of said request to acquire the sample voice profile;

an email message indicative of said request to acquire the sample voice profile;

wherein the step l) comprises generating, by means of the voice assistant, a voice message indicative of a request to say a defined phrase or indicative of a request to say the alphanumeric code, wherein the step m) comprises acquiring, from the voice assistant, a sound representative of the defined phrase requested or representative of the alphanumeric code.

8. The method according to claim 6, during the security operation:

wherein in step j) said transmission of the request to acquire the sample voice/face profile comprises, alternatively:

performing, between the operative server device and the electronic device, a voice call carrying said request to acquire the sample voice/face profile;

a text message indicative of said request to acquire the sample voice/face profile;

an audio message indicative of said request to acquire the sample voice/face profile;

an email message indicative of said request to acquire the sample voice/face profile;

wherein the step l) comprises generating, by means of the voice assistant, a voice message indicative of a request to say a defined phrase and indicative of a request to take a photo of the face of the subject, wherein the step n) comprises acquiring, by means of a camera of the electronic device, an image representative of at least part of the face of the subject and comprises transmitting, from the electronic device towards the profiling server device, an audio-video message carrying the sample digital audio track of the subject and carrying the image representative of at least part of the face of the subject;

and wherein the step s) comprises generating the sample voice/face profile of the subject, as a function of the sample audio track of the voice of the subject and as a function of the image representative of at least part of the face of the subject.

9. The method according to claim 4, during the securing operation:

wherein in step j) said transmission of the request to acquire the sample voice profile comprises, alternatively:

performing, between the profiling server device and the electronic device, a voice call carrying said request to acquire the sample voice profile;

a text message indicative of said request to acquire the sample voice profile;

a text message carrying an alphanumeric code;

an audio message indicative of said request to acquire the sample voice profile;

an email message indicative of said request to acquire the sample voice profile;

wherein the step l) comprises generating, by means of the voice assistant, a voice message indicative of a request to say a defined phrase or indicative of a request to say the alphanumeric code, wherein the step m) comprises acquiring, from the voice assistant, a sound representative of the defined phrase requested or representative of the alphanumeric code.

10. The method according to claim 1, during the security operation, wherein in step j) said transmission of the request to acquire the sample voice profile comprises, alternatively:

performing, between the profiling server device and the electronic device, a voice call carrying said request to acquire the sample voice profile;

a text message indicative of said request to acquire the sample voice profile;

a text message carrying an alphanumeric code;

an audio message indicative of said request to acquire the sample voice profile;

an email message indicative of said request to acquire the sample voice profile;

wherein the step l) comprises generating, by means of the voice assistant, a voice message indicative of a request to say a defined phrase or indicative of a request to say the alphanumeric code, wherein the step m) comprises acquiring, from the voice assistant, a sound representative of the defined phrase requested or representative of the alphanumeric code.

11. The method according to claim 1, comprising during the security operation, in place of steps n)-u), the steps of:

n2) forwarding the sample digital audio track to the electronic device and generating, by means of a processing unit of the electronic device, a sample feature vector as a function of the sample digital audio track of the voice of the subject;

o2) Transmitting, from the electronic device towards the first authentication server device, a fifth message indicative of a request for a first portion of a reference feature vector of the subject;

p2) receiving, at the first authentication server device, the fifth message and reading, from a memory associated with the first authentication server device, the first portion of the reference feature vector and transmitting, towards the electronic device, a sixth message carrying the first portion of the reference feature vector;

q2) receiving, at the electronic device, the sixth message and storing the first portion of the reference feature vector in a memory of the electronic device;

r2) transmitting, from the electronic device towards the second authentication server device, a seventh message indicative of a request for a second portion of a reference feature vector of the subject;

s2) receiving, at the second authentication server device, the seventh message and reading, from a memory associated with the second authentication server device, the second portion of the reference feature vector and transmitting, towards the electronic device, an eighth message carrying the second portion of the reference feature vector;

t2) receiving, at the electronic device, the eighth message and storing the second portion of the reference feature vector in the memory of the electronic device;

u2) recomposing, by means of the processing unit of the electronic device, the first and second portion so as to regenerate the reference feature vector;

v2) comparing, by means of the processing unit of the electronic device, the sample feature vector with respect to the reference feature vector and detecting that they are compatible with each other;

z2) transmitting, from the electronic device towards the payment server device, a ninth message indicative of a confirmation of the identity of the subject and indicative of a request for confirmation of the payment for the requested good or service.

12. A non-transitory computer-readable storage medium having a program comprising software code portions adapted to perform the steps of the method according to claim 1, when said program is run on at least one computer of the operative server device.

13. An electronic system to securely enable payment of a good or service by means of voice commands, the system comprising a voice assistant, an electronic human language processor connected to the voice assistant, an application for delivering services to be paid connected to the electronic human language processor, an operative server device connected to the application for delivering services to be paid, a first authentication server device connected to the operative server device, a second authentication server device connected to the operative server device and a payment server device connected to the operative server device, wherein the voice assistant is configured to:

receive a voice message indicative of a request for delivering a good or service to be paid and transmit, towards the electronic human language processor, an audio message indicative of the request for delivering the good or service to be paid; receive an audio message indicative of availability of the requested good or service to be paid and indicative of the request for payment of the cost of the requested good or service and generate a voice message indicative of the availability of the requested good or service to be paid and indicative of the request for payment of the cost of the requested good or service;

receive a voice message indicative of a confirmation of the wish to pay for the requested good or service and transmit, towards the electronic human language processor, an audio message indicative of the confirmation of the wish to pay for the requested good or service;

receive an audio message indicative of a request to say a phrase and generate a voice message indicative of the request to say the phrase during a security operation;

acquire a sound representative of the requested phrase and generate therefrom a sample digital audio track representative of the voice of the subject during the security operation;

forward the sample digital audio track to the electronic device during the security operation;

receive an audio message indicative of a confirmation of the payment for the requested good or service and generate a voice message indicative of the confirmation of the payment for the requested good or service during the security operation;

wherein the electronic human language processor is configured to:

receive the audio message indicative of a request for delivering the good or service to be paid and transmit, towards the application for delivering services to be paid, a first message indicative of the request for delivering the good or service to be paid;

receive a third message indicative of a confirmation of availability of the requested good or service to be paid and indicative of a request for payment of the cost of the requested good or service and transmit towards the voice assistant an audio message indicative of the availability of the requested good or service to be paid and indicative of the request for payment of the cost of the requested good or service;

receive the audio message indicative of the confirmation of the wish to pay for the requested good or service and transmit, towards the application for delivering services to be paid, a first text message indicative of the confirmation of the wish to pay for the requested good or service;

receive a twelfth message indicative of the confirmation of the payment for the requested good or service and forward it to the voice assistant;

wherein the application for delivering services to be paid is configured to:

receive the first message and transmit, towards the operative server device, a second message indicative of a request for availability of the requested good or service to be paid;

receive the third message and forward it to the electronic human language processor;

receive the text message indicative of the confirmation of the wish to pay for the requested good or service and transmit, towards the operative server device, a fourth message indicative of a request to pay for the requested good or service;

receive the eleventh message and forward it to the electronic human language processor;

wherein the operative server device is configured to:

receive the second message;

receive the third message and forward it to the application for delivering services to be paid;

receive the fourth message and transmit, towards an electronic device, a request to acquire a sample voice profile of a subject with which the electronic device is associated during the security operation;

receive the audio message representative of the sample digital audio track of the voice of the subject and transmit, towards a first authentication server device, a sixth message indicative of a request for a first portion of a reference voice profile of the subject during the security operation;

receive a seventh message carrying the first portion of the reference voice profile and transmitting, towards a second authentication server device, an eighth message indicative of a request for a second portion of the reference voice profile of the subject during the security operation;

receive a ninth message carrying the second portion of the reference voice profile, generate a sample voice profile as a function of the sample audio track of the voice of the subject and recompose the first and second portion so as to regenerate a reference voice profile during the security operation;

compare the sample voice profile with respect to the reference voice profile and detect that they are compatible with each other during the security operation;

transmit, towards the payment server device, a tenth message indicative of a confirmation of the identity of the subject and indicative of a request to confirm the payment for the requested good or service during the security operation;

receive an eleventh message indicative of a confirmation of payment for the requested good or service and transmit, towards the application for delivering services to be paid, the twelfth message;

and wherein the first authentication server device is configured to:

receive the sixth message, read the first portion from a memory associated with the first authentication server device and transmit, towards the operative server device, the seventh message carrying the first portion of the reference voice profile during the security operation;

wherein the second authentication server device is configured to:

receive the eighth message, read the second portion of the reference voice profile from a memory associated with the second authentication server device and transmit, towards the operative server device the ninth message carrying the second portion of the reference voice profile during the security operation;

and wherein the payment server device is configured to:

receive the tenth message indicative of a confirmation of the identity of the subject and indicative of a request to confirm the payment for the requested good or service and verify if the subject is authorized to make the payment for the requested good or service;

detect that the subject is authorized to make the payment for the requested good or service and transmit towards the operative server device, the eleventh message during the security operation;

and wherein the electronic device is configured to:

receive said request to acquire the sample voice profile and forward it to the voice assistant during the security operation;

receive the sample digital audio track of the voice of the subject and transmit, towards the profiling server device, the audio message carrying the sample digital audio track of the subject during the security operation.

14. The system according to claim 13, further comprising a service aggregator connected to the operative server device and an external service provider connected to the service aggregator, wherein the operative server device is further configured to receive the second message indicative of the request for availability of the requested service to be paid and forward it to the service aggregator, wherein the service aggregator is configured to:

receive the second message and forward it to the external service provider;

receive the third message and forward it to the operative server device;

and wherein the external service provider is configured to:

receive the second message and check if the requested good or service to be paid is available;

detect the availability of the requested good or service to be paid and transmit, towards the service aggregator, the third message indicative of the confirmation of availability of the requested good or service to be paid and indicative of the request for payment of the cost of the requested good or service.

15. The system according to claim 14, during the security operation:

wherein the operative server device is further configured to:

transmit, towards the electronic device, said request comprising a request to acquire a sample voice/face profile of the subject;

receive a message carrying a sample digital audio track of the voice of the subject and an image representative of at least part of the face of the subject and transmit, towards the first authentication server device, the sixth message indicative of the request for the first portion of a reference voice/face profile of the subject;

receive the seventh message and transmit the eighth message indicative of a request for a second portion of the reference voice/face profile of the subject;

wherein the electronic device is further configured to:

receive said request to acquire the sample voice/face profile and forward it to the voice assistant;

transmit, towards the operative server device, the message carrying the sample audio track of the voice of the subject and the image representative of at least part of the face of the subject;

wherein the voice assistant is further configured to:

further receive a request to acquire an image of at least one part of the face of the subject;

acquire the image of at least part of the face of the subject by means of a camera of the electronic device;

forward to the electronic device the sample audio track of the voice of the subject and the image representative of at least part of the face of the subject;

wherein the first authentication server device is further configured to:

receive the sixth message, read the first portion of the voice/face profile from the memory associated with the first authentication server device and transmit, towards the operative server device, the seventh message carrying the first portion of the reference voice/face profile;

wherein the second authentication server device is further configured to:

receive the eighth message, read the second portion of the reference voice/face profile from the memory associated with the second authentication server device and transmit, towards the operative server device the seventh message carrying the second portion of the reference voice/face profile;

and wherein the operative server device is further configured to:

receive the ninth message, generate a sample voice/face profile as a function of the sample audio track of the voice of the subject and as a function of the image representative of at least part of the face of the subject, and recompose the first and second portion so as to regenerate the reference voice/face profile;

compare the sample voice profile with respect to the reference voice profile and detect that they are compatible with each other.

16. The system according to claim 13, wherein the operative server device is further configured to during the security operation:

transmit, towards the electronic device, said request comprising a request to acquire a sample voice/face profile of the subject;

receive a message carrying a sample digital audio track of the voice of the subject and an image representative of at least part of the face of the subject and transmit, towards the first authentication server device, the sixth message indicative of the request for the first portion of a reference voice/face profile of the subject;

receive the seventh message and transmit the eighth message indicative of a request for a second portion of the reference voice/face profile of the subject;

wherein the electronic device is further configured to:

receive said request to acquire the sample voice/face profile and forward it to the voice assistant;

transmit, towards the operative server device, the message carrying the sample audio track of the voice of the subject and the image representative of at least part of the face of the subject;

wherein the voice assistant is further configured to:

further receive a request to acquire an image of at least one part of the face of the subject;

acquire the image of at least part of the face of the subject by means of a camera of the electronic device;

forward to the electronic device the sample audio track of the voice of the subject and the image representative of at least part of the face of the subject;

wherein the first authentication server device is further configured to:

receive the sixth message, read the first portion of the voice/face profile from the memory associated with the first authentication server device and transmit, towards the operative server device, the seventh message carrying the first portion of the reference voice/face profile;

wherein the second authentication server device is further configured to:

receive the eighth message, read the second portion of the reference voice/face profile from the memory associated with the second authentication server device and transmit, towards the operative server device the seventh message carrying the second portion of the reference voice/face profile;

and wherein the operative server device is further configured to:

receive the ninth message, generate a sample voice/face profile as a function of the sample audio track of the voice of the subject and as a function of the image representative of at least part of the face of the subject, and recompose the first and second portion so as to regenerate the reference voice/face profile;

compare the sample voice profile with respect to the reference voice profile and detect that they are compatible with each other.

17. An operative server device comprising a transceiver and a processing unit and configured to perform a security operation, wherein the transceiver is configured to, during the security operation:

receive a second message indicative of a request for availability of the requested good or service to be paid;

receive a third message indicative of a confirmation of availability of the requested good or service to be paid and indicative of a request for payment of the cost of the requested good or service and forward it to an application for delivering services to be paid;

receive a fourth message indicative of a request to pay for the requested good or service and transmit a request to acquire a sample voice profile of a subject to which the electronic device is associated;

receive an audio message representative of the sample digital audio track of the voice of the subject and transmit, towards a first authentication server device, a sixth message indicative of a request for a first portion of a reference voice profile of the subject;

receive a seventh message carrying the first portion of the reference voice profile and transmitting, towards a second authentication server device, an eighth message indicative of a request for a second portion of the reference voice profile of the subject;

receive a ninth message carrying the second portion of the reference voice profile;

and wherein the processing unit is configured to, during the security operation:

generate a sample voice profile, as a function of the received sample audio track;

recompose the first and second portion so as to regenerate a reference voice profile;

compare the sample voice profile with respect to the reference voice profile and detect that they are compatible with each other;

and wherein the transceiver is further configured to:

transmit a tenth message indicative of a confirmation of the identity of the subject and indicative of a request to confirm the payment for the requested good or service;

receive an eleventh message indicative of a confirmation of payment for the requested good or service and transmit a twelfth message indicative of a confirmation of the payment for the requested good or service.

18. A method for a security operation for voice commands, the method comprising:

receiving a message related to a voice command at an operative server device;

transmitting, towards an electronic device, a request to acquire a sample voice profile of a subject associated with the electronic device;

receiving, at the electronic device, said request to acquire the sample voice profile and forwarding the sample voice profile to a voice assistant;

receiving, at the voice assistant, an audio message indicative of a request to say a phrase;

generating a voice message indicative of the request to say the phrase during the security operation;

acquiring, at the voice assistant, a sound representative of the requested phrase;

generating therefrom a sample digital audio track representative of the voice of the subject;

forwarding the sample digital audio track to the electronic device and transmitting, from the electronic device towards the operative server device, an audio message carrying the sample digital audio track representative of the voice of the subject;

receiving, at the operative server device, the audio message representative of the sample digital audio track of the voice of the subject;

transmitting, towards a first authentication server device, a first message indicative of a request for a first portion of a reference voice profile of the subject;

receiving, at the first authentication server device, the first message;

reading the first portion from a memory associated with the first authentication server device;

transmitting, towards the operative server device, a second message carrying the first portion of the reference voice profile;

receiving, at the operative server device, the second message;

transmitting, towards a second authentication server device, a third message indicative of a request for a second portion of the reference voice profile of the subject;

receiving, at the second authentication server device, the third message;

reading a second portion of the reference voice profile from a memory associated with the second authentication server device;

transmitting, towards the operative server device, a fourth message carrying the second portion of the reference voice profile;

receiving, at the operative server device, the fourth message;

generating a sample voice profile as a function of the sample audio track of the voice of the subject and recomposing the first and second portion so as to regenerate the reference voice profile;

comparing, at the operative server device, the sample voice profile with respect to the reference voice profile and detecting that they are compatible with each other during;

transmitting, from the operative server device, a fifth message indicative of a confirmation of and identity of the subject.

* * * * *